US010320655B1

(12) United States Patent
Asveren et al.

(10) Patent No.: US 10,320,655 B1
(45) Date of Patent: Jun. 11, 2019

(54) METHODS AND APPARATUS FOR DETERMINING AND USING SDN LINK AND/OR PATH STATUS

(71) Applicant: Ribbon Communications Operating Company, Inc., Westford, MA (US)

(72) Inventors: Tolga Asveren, Bordentown, NJ (US); Kevin Riley, Amesbury, MA (US); Dan Malek, Minden, NV (US)

(73) Assignee: Ribbon Communications Operating Company, Inc., Westford, MA (US)

( * ) Notice: Subject to any disclaimer, the term of this patent is extended or adjusted under 35 U.S.C. 154(b) by 46 days.

(21) Appl. No.: 15/216,547

(22) Filed: Jul. 21, 2016

(51) Int. Cl.
*H04L 12/721* (2013.01)
*H04L 12/717* (2013.01)
*H04L 12/715* (2013.01)

(52) U.S. Cl.
CPC ............ *H04L 45/123* (2013.01); *H04L 45/42* (2013.01); *H04L 45/64* (2013.01)

(58) Field of Classification Search
None
See application file for complete search history.

(56) References Cited

U.S. PATENT DOCUMENTS

| | | | |
|---|---|---|---|
| 2009/0238208 A1* | 9/2009 | Naka | H04L 1/0007 370/470 |
| 2015/0312142 A1* | 10/2015 | Barabash | H04L 45/42 370/400 |
| 2016/0315847 A1* | 10/2016 | Zhang | H04L 12/6418 |
| 2016/0380892 A1* | 12/2016 | Mahadevan | H04L 45/42 370/389 |
| 2017/0187609 A1* | 6/2017 | Lee | H04L 45/12 |
| 2017/0237851 A1* | 8/2017 | Hassan | H04L 43/08 370/252 |
| 2018/0026901 A1* | 1/2018 | Sugunadass | H04L 47/29 |

* cited by examiner

*Primary Examiner* — Saba Tsegaye
(74) *Attorney, Agent, or Firm* — Straub & Straub; Stephen T. Straub; Michael P. Straub

(57) ABSTRACT

The present invention relates to communications methods, apparatus and systems for determining and using Software Defined Networking (SDN) communications link and path status information. An exemplary embodiment of a method of operating a Session Border Controller (SBC) in a software defined network (SDN) includes: determining application level metrics at a SBC for a data communications flow and transmitting the application level metrics to a SDN controller. An exemplary embodiment of a method of operating a software defined networking (SDN) controller in a software defined network includes the steps of receiving, at a receiver of the SDN controller via the software defined network, application level metrics corresponding to a data communications session flow; and determining, by the SDN controller, the status of a communications path between two Internet Protocol addresses based on the received application level metrics. Exemplary apparatus embodiments include an SDN controller and SBC controller implementing the exemplary methods.

20 Claims, 14 Drawing Sheets methods and apparatus and systems for determining and using Software Defined Networking (SDN) communications link and/or path status information.

BACKGROUND

Software Defined Networking is a new paradigm in how networks are managed. A central node is utilized to control forwarding behavior of elements rather than each element determining forwarding behavior itself. Applications interact with this central node also referred to as a controller to setup network paths for their specific needs.

A key aspect of Software Defined Networking is the network controller having a holistic view of the topology and capabilities of the underlying network infrastructure. This is essential so that the controller can determine the optimum path to send packets from one edge of the network to another edge of the network. An important part of this process is the information about the recent/current status of links between elements/devices in the network. The SDN controller performs various checks/audits to gather this information.

However, the various checks/audits that the SDN controller can perform are limited and due to these limitations, the SDN controller cannot always determine the most recent/current status of links and/or the optimum routing paths through the software defined network.

From the above discussion, it should be appreciated that there is a need for improved methods, apparatus and systems for determining the status of links in a software defined network by a SDN controller. Furthermore, there is also a need for improved methods, apparatus and systems for optimizing routing paths through software defined networks.

SUMMARY

The present invention is directed to various communications methods, apparatus and systems for efficiently determining the status of communications links and/or paths in a software defined network based on application level metrics. The present invention also provides new methods, apparatus, and systems for optimizing routing paths through software defined networks based on the use of application level metrics. The present invention addresses the problems described above.

In addition to the limited checks/audits that an SDN controller can perform, certain software applications executed by devices in a software defined network measure quality of the communications network and/or service as perceived by their own service logic. For example, a Session Border Controller (SBC) measures the quality of a session based on a variety of factors including for example based on number of packets exchanged, packet loss, loss rate, discard rate due to late arrival of packets, burst density, gap density, burst durations, gap durations, Mean Opinion Score (MOS) score, Rx factor, jitter, round-trip-time, and number of consecutive packet losses for packet loss periods experienced during the call. These measurements can be made using known techniques. Furthermore, a SBC also collects metrics for signaling messages, e.g., the delay between egressing a session setup request and receipt of the corresponding session answer reply. These measurements provide information about a path used for a particular flow. The present invention makes use of application level metrics determined by devices such as SBCs in software defined networks to determine the status of paths and links in the SDN system and to generate more efficient and optimal paths through the SDN network for data flows.

In an exemplary method of operating a software defined networking (SDN) controller in a software defined network in accordance with the invention, the method includes: receiving, at a receiver of the SDN controller via said software defined network, application level metrics corresponding to a data communications session flow; and determining, by the SDN controller, the status of a communications path between two Internet Protocol addresses based on the received application level metrics.

In some embodiments, the application level metrics include a quality of session metric based on one or more of the following: number of packets exchanged, packet loss, loss rate, discard rate due to late arrival of packets, burst density gap, gap durations, Mean Opinion Score (MOS) score, Rx factor, jitter, round-trip-time, and number of consecutive packet losses for packet loss periods experienced during the session. In some embodiments, the exemplary method further includes receiving, at said receiver of the SDN controller, application level metrics corresponding to a communications signaling flow for said data communications session flow. In some embodiments, the application level metrics for the data communications flow are for the communications path between said two Internet Protocol addresses.

In some embodiments, the exemplary method further includes receiving, at a receiver of the SDN controller via said software defined network subsequent to receiving said application level metrics, a request for a data flow communications path between said two Internet Protocol addresses; determining said data flow communications path between said two Internet Protocol addresses based on said application level metrics; and transmitting, from a transmitter of the SDN controller, in response to said request for a data flow path the determined data flow communications path between said two Internet Protocol addresses.

The method of claim 6 wherein said determining said data flow communications path between said two Internet Protocol addresses based on said application level metrics includes determining which links and devices in the software defined network need to be traversed for optimum network utilization or quality.

In some embodiment, the method step of determining said data flow communications path between said two Internet Protocol addresses includes: determining multiple different paths through the software defined network; deducting from application level metrics received for different data communications flows the status of links on each of the different multiple paths determined; and eliminating any paths which include a link deducted as experiencing a problem.

In some embodiments, the application level metrics are included in one or more messages, the one or more messages including a data communications session flow identifier, the data communications session flow identifier identifying the data communications session flow to which the application level metrics pertain.

The invention is also applicable to apparatus which implement the described methods. For example, a software defined networking (SDN) controller in accordance with an embodiment of the present invention includes: a receiver for receiving via a software defined network application level metrics corresponding to a data communications session flow; and a processor configured to control the SDN controller to determine the status of a communications path between two Internet Protocol addresses based on the received application level metrics.

The invention is also applicable to methods of operating devices such as for example, Session Border Controllers, in a software defined networking systems. An exemplary method of operating a Session Border Controller (SBC) in a software defined network (SDN) in accordance with the present invention includes: transmitting from a transmitter in the Session Border Controller to a SDN network controller a request for a path for a data communications session flow between a first Internet Protocol address corresponding to said SBC and a second Internet Protocol address; receiving at a receiver of the SBC a data communications session flow path with a data communications session flow identifier in response to said request; determining application level metrics at said SBC for said data communications flow; and transmitting from said transmitter in the Session Border Controller the application level metrics to the SDN controller. In some embodiments of the exemplary method of operating a SBC the application level metrics include the results of measurements made by the Session Border Controller.

The invention is also applicable to apparatus such as Session Border Controllers. A Session Border Controller (SBC) in accordance with an exemplary embodiment of the invention includes: a transmitter for transmitting from the Session Border Controller to a SDN network controller a request for a path for a data communications session flow between a first Internet Protocol address corresponding to said SBC and a second Internet Protocol address; a receiver for receiving a data communications session flow path with a data communications session flow identifier in response to said request; a processor configured to control said Session Border Controller to determine application level metrics at said SBC for said data communications flow; and said transmitter configured to transmit said application level metrics to the SDN controller.

The invention is also applicable to system embodiments in which the system implements the methods described above.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
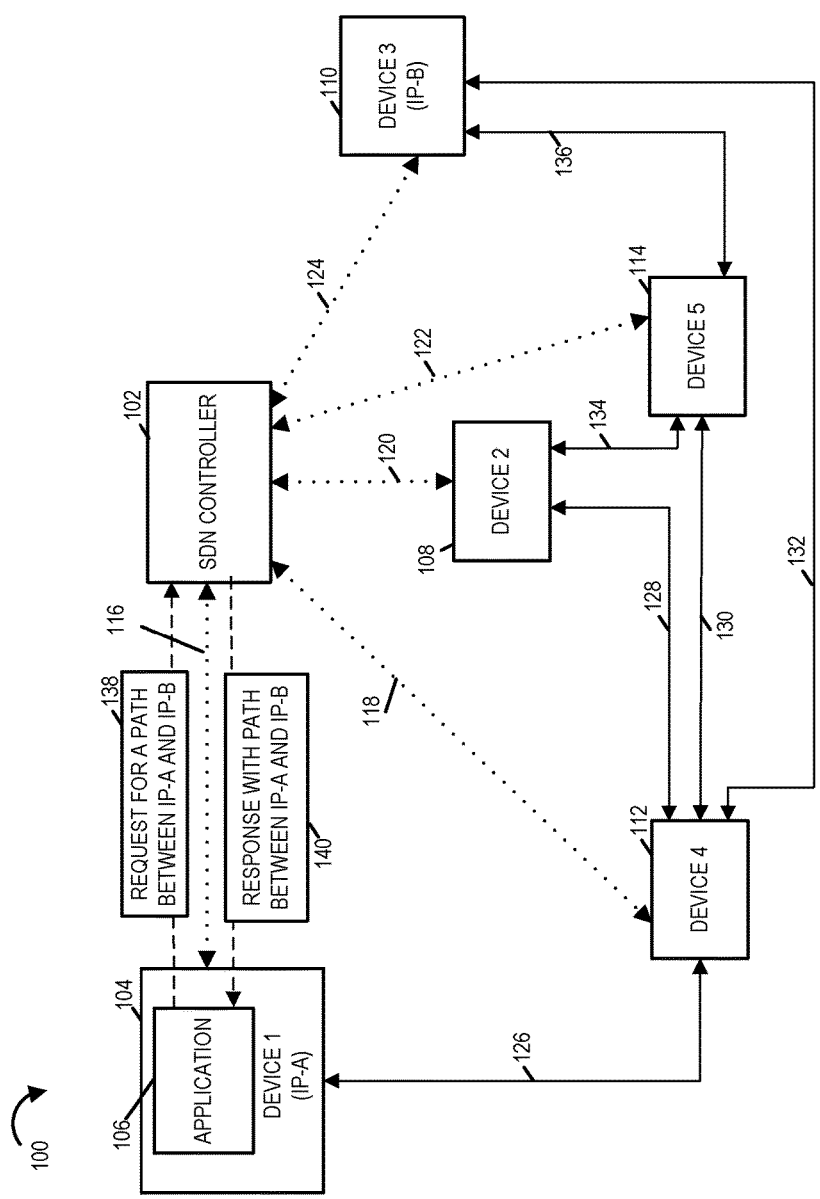
FIG. 1 illustrates the typical process in which a SDN controller provides the communications path from a first address to a second address.

FIG. 1 illustrates how a software application being executed on a processor in a device requests and receives communication path/route information for establishing a communications session in a Software Defined Networking (SDN) system.

The SDN system 100 includes a Software Defined Networking Controller 102, a device 1 104 including an application 106, a device 2 108, a device 3 110, a device 4 112, a device 5 114, communications links 126, 128, 130, 132, 134 and 136, and communications links/control channels 116, 118, 120, 122, and 124. The SDN controller 102 is coupled to each of the devices 1, 2, 3, 4 and 5 via the communications links/control channels 116, 118, 120, 122, and 124. Communications link/control channel 116 couples the SDN controller 102 to device 1 104. Communications link/control channel 118 couples the SDN controller 102 to device 4 112. Communications link/control channel 120 couples the SDN controller 102 to device 2 108. Communications link/control channel 122 couples the SDN controller 102 to device 5 114. Communications link/control channel 124 couples the SDN controller 102 to device 3 110. The communications links/control channels are used for exchanging messages, signals and information between the SDN controller and the devices for managing the network. Communications link 126 couples device 1 104 to device 4 112. Communication link 128 couples device 4 112 to device 2 108. Communications link 130 couples device 4 112 to device 5 114. Communications link 132 couples device 4 112 to device 3 110. Communications link 134 couples device 2 108 to device 5 114. Communications links 136 couples device 5 114 to device 3 110. Device 1 104 has an Internet Portal address IP-A and device 3 110 has an Internet Protocol Address IP-B.

In the SDN system 100, the SDN controller 102 is utilized to control forwarding behavior of the elements/devices in the system 100 rather than each element/device determining forwarding behavior itself. Applications being executed by the devices 1, 2, 3, 4, and 5 such as for example, application 106 being executed by device 1 104 interacts with the SDN controller 102 to setup network paths for their specific needs. An example of this interaction is shown in FIG. 1 wherein application 106 of device 1 104 transmits a request 138 for a path between device 1's Internet Protocol Address IP-A and device 3's Internet Protocol Address IP-B. This request is sent over the communications link/control channel 116. The SDN Controller 102 determines the communication path and transmits a response 140 to the application 106 via communications link/control channel 116. The response includes the communications path/route between device 1 and device 3 and more particularly between Internet Protocol address IP-A and Internet Protocol address IP-B. In this example, the SDN controller has three different communications path to chose from. The SDN controller has several communication paths to chose from including: a first communications path including communications link 126, device 4 112, communications link 128, device 2 108, communication link 134, device 5 114 and communications link 136, a second communication path including communications link 126, device 4 112, communications link 130, device 5 114, and communications link 136, and a third communications path including communications link 126, device 4 112, and communications link 132. The SDN controller 102 determines the communication path to be selected for the application based on a variety of factors including the status of the communications links/devices in the communication path to be traversed. In this example, the SDN Controller 102 selects the third communications path and includes routing/path information in the response 140 for this communications path/route.

The SDN controller has information on the topology and capabilities of the SDN network and the underlying network infrastructure, e.g., devices, communications links, etc. which it uses in determining the communication path to be provided in response to requests, such as request 138. As mentioned above an important part of the process for determining the communications path to be selected is the information about the recent/current status of links between elements/devices. The SDN controller performs various checks/audits to gather this information.

In addition to the limited checks/audits that an SDN controller can perform certain software applications executed by devices in a software defined network measure quality of the communications network and/or service as perceived by their own service logic. For example, a Session Border Controller (SBC) measures the quality of a session based on a variety of factors including for example based on number of packets exchanged, packet loss, loss rate, discard rate due to late arrival of packets, burst density, gap density, burst durations, gap durations, Mean Opinion Score (MOS) score, Rx factor, jitter, round-trip-time, and number of consecutive packet losses for packet loss periods experienced during the call. Furthermore, a SBC also collects metrics for signaling messages, e.g., the delay between egressing a session setup request and receipt of the corresponding session answer reply. These measurements provide information about a path/route used for a particular communications session. Most of them require application level knowledge (e.g., Real-time Transport Protocol (RTP)/Real-time Transport Control Protocol (RTCP) awareness) and/or interpretation and cannot be measured solely by the controller. These application level metrics can provide additional information for the controller to determine the recent/current status of the links/devices if they were available for use by the SDN controller.

Figure 2:
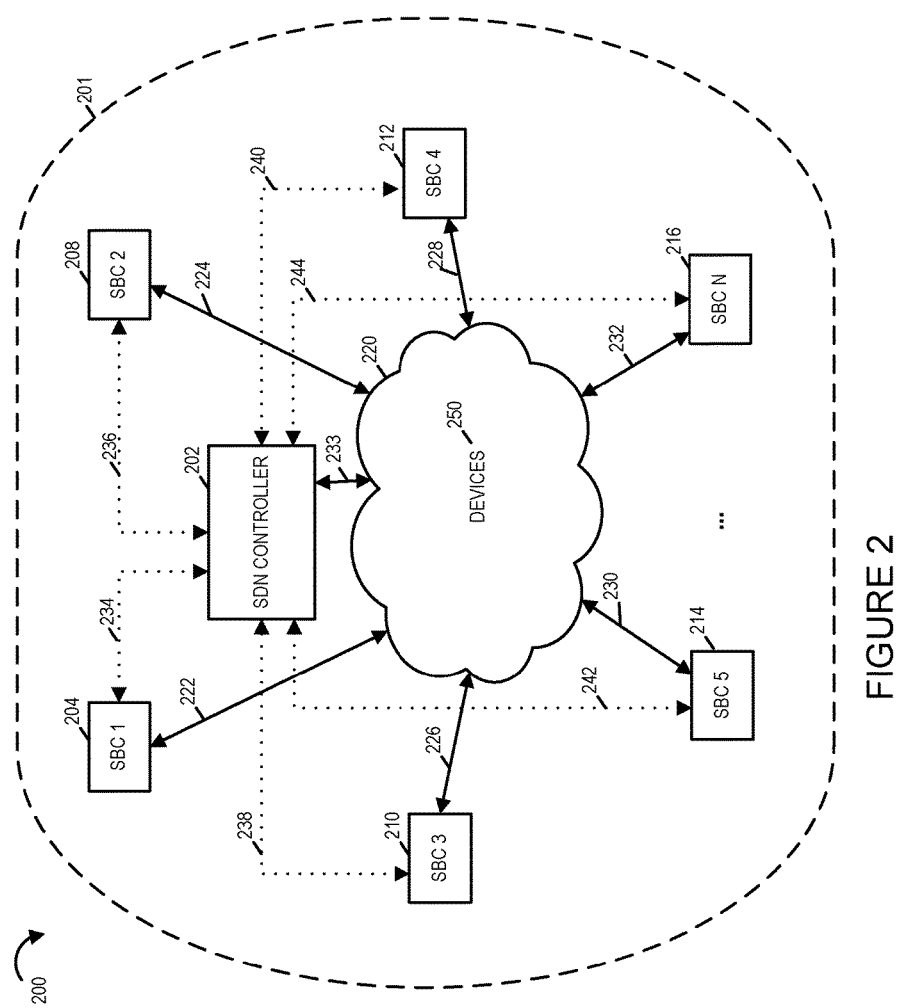
FIG. 2 illustrates a software defined networking system in accordance with an embodiment of the present invention.

FIG. 2 illustrates an exemplary system 200 in accordance with the present invention. The exemplary system 200 includes a network 201 which may be, and in some embodiments is, a transit network owned and/or operated by a transmit service provider. A transit network being a network which passes traffic between other networks in addition to carrying traffic for its own hosts and having connections/paths to at least two other networks. The exemplary network 201 utilizes Session Border Controllers at the network edges to connect to other networks.

The exemplary system 200 is a SDN system which includes a SDN controller 202, SBC 1 204, SBC 2 208, SBC 3 210, SBC 4 212, SBC 5 214, . . . , SBC N 216 where N is a positive integer number, devices 250, intra-communications network 220 which is made up of communications links and includes devices 250, communications links 222, 224, 226, 228, 230, 232, and 233, communications links/control channels 234, 236, 238, 240, 242, and 244. The intra-communications network 220 couples each of the elements of the network together allowing for the exchange of signals, information and data between the different elements of the network 201. The communications links 222, 224, 226, 228, 230, . . . , 232 couple SBC 1 204, SBC 2 208, SBC 3 210, SBC 4 212, SBC 5 215, . . . , SBC N 216 to the network 220 and therein to the devices 250 and the other SBCs and SDN controller in the network 201. Similarly the communications link 233 couples the SDN controller to the network 220 and therein to the devices 250 and the SBCs in the network 201. Communications links/control channels 234, 236, 238, 240, 242, . . . , 244 couple SBC 1 204, SBC 2 208, SBC 3 210, SBC 4 212, SBC 5 214, . . . , SBC N 216 to SDN controller 202 and are used for exchanging control signals and information. The communications links/control channels may be, and in some embodiments are, part of the communications network 220. In some embodiments, they are logical control channels on physical communications links. Each of the communications links may be, and in some embodiments are, multiple communications links.

The SBCs 204, 208, 210, 212, 214, 216 may be and typically are connected to one more devices or external public and/or private networks, e.g., Internet or another service providers network.

Elements or steps with the same reference numbers used in different figures are the same or similar and those elements or steps will not be described in detail again.

Figure 3:
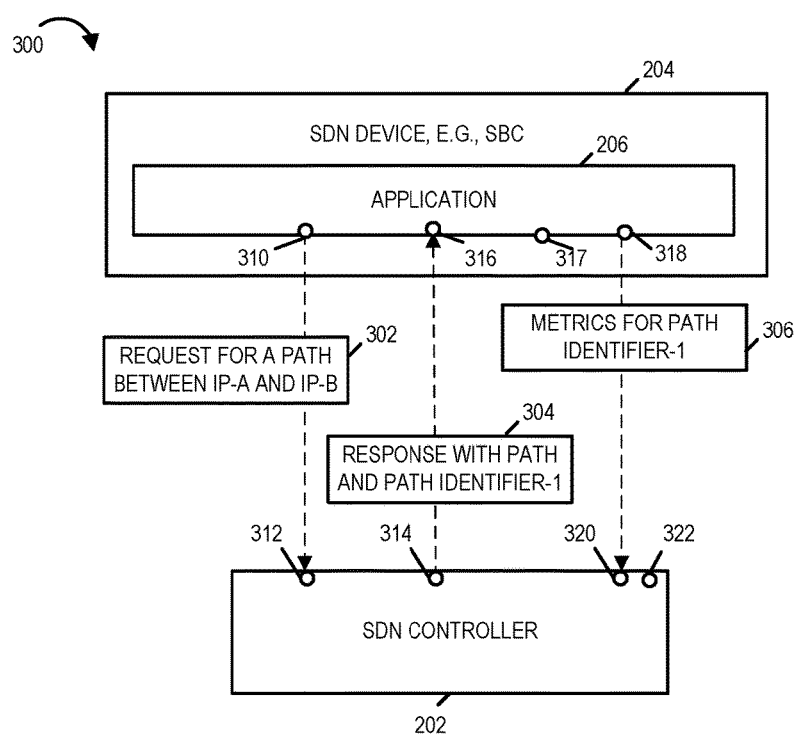
FIG. 3 illustrates the steps and associated signaling exchange between various devices in accordance with one embodiment of the present invention.

Exemplary method 300 illustrated in FIG. 3 shows the steps and associated signaling in accordance with one embodiment of the present invention.

For explanatory purposes simplified request and response messages are depicted with the messages and information contained therein illustrated which are most pertinent to explaining the present embodiment of the invention. As it will be appreciated additional information and formatting of the messages as well as the use of additional messages may be and typically is used in initiating and communicating among entities in Software Defined Networking environments. In some embodiments, the SDN controller 202 of FIG. 3 is implemented in accordance with the SDN controller 500 illustrated in FIG. 5 and the SDN device, e.g., SBC 204 is implemented in accordance with the device 600 illustrated in FIG. 6. The SDN controller device 500 and device 600 will now be described.

Figure 5:
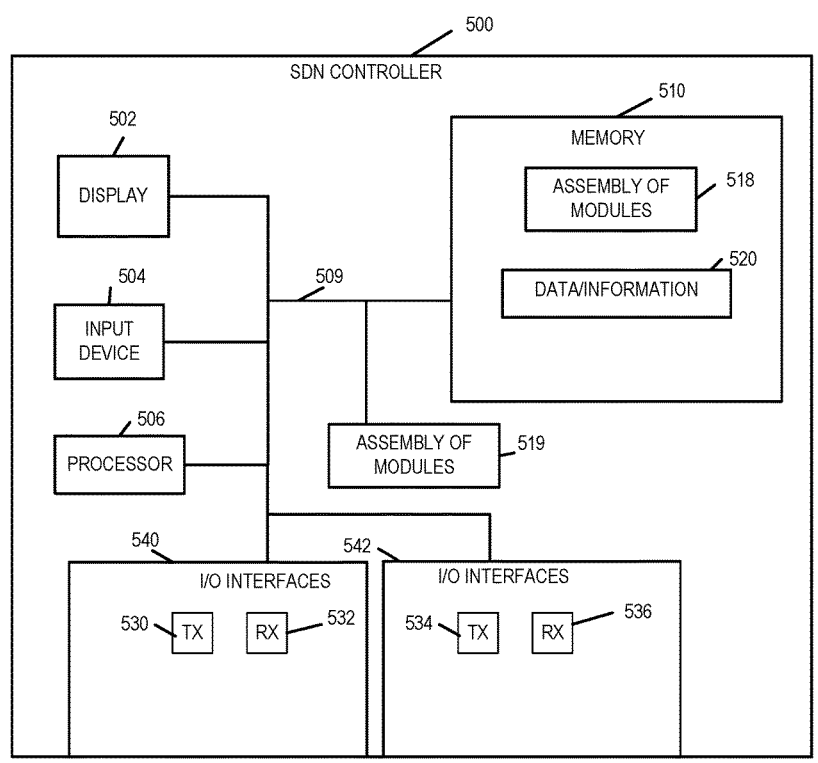
FIG. 5 illustrates an exemplary SDN controller in accordance with one embodiment of the present invention.

FIG. 5 illustrates an exemplary embodiment of a SDN controller device 500 in accordance with one embodiment of the present invention. Exemplary SDN controller device 500 includes a display 502, an input device 504, a processor 506, e.g., a CPU, input/output (I/O) interfaces 540 and 542, which couple the SDN controller to a core SDN network and/or various other devices including e.g. SBCs and other devices, memory 510, and an assembly of modules 519, e.g., circuits corresponding to different modules, coupled together via a bus 509 over which the various elements may exchange data and information. Memory 510 includes an assembly of modules 518, e.g., an assembly of software modules, and data/information 520. The I/O interface 540 includes transmitters 530 and receivers 532. The I/O interface 542 includes transmitters 534 and receivers 536. The SDN controller 500 transmitter and receivers are configured to utilize a plurality of different protocols. In at least some embodiments, one or more of the I/O interfaces and associated receivers and transmitters are configured to use a protocol/communication mechanism which is proprietary in nature or contains proprietary messages or message portions, e.g., fields, to communicate and exchange signals, messages and information with other devices, e.g., SDN devices such as SBCs in the SDN system. In some such embodiments, the protocol can be based on extending a representational state transfer Application Programming Interface (REST API) provided by the SDN Controller to the device, e.g., SBC. In some other embodiments, the protocol can be based on extending a command line interface (CLI) provided by the SDN Controller to the device. In yet other embodiments other standard protocols with proprietary extensions are employed for exchanging signaling, messages and information between the SDN controller and other devices. In some embodiments, the SDN controller includes a communications module configured to operate in accordance with one or more protocols to communicate with other devices using a REST API or a CLI signaling method. In some embodiments, the communication module is a hardware module, a software module or a module including hardware and software components.

The SDN controller device is also configured to have a plurality of Internet Protocol (IP) address/port number pairs, e.g., logical IP address/port pairs, for use in exchanging signaling information. In some embodiments the I/O interfaces include IP address/port pairs. The I/O interfaces in some embodiments are configured to communicate in accordance with the IP, Transport Control Protocol (TCP), and User Datagram Protocol (UDP). In some embodiments, the SDN controller 500 includes a communication module configured to operate using IP, TCP, and UDP protocol signaling methods. In some embodiments, the communication module is a hardware module, a software module or a module including hardware and software components. In some embodiments, the SDN controller of FIGS. 2, 3, and/or 4 are a SDN controller implemented in accordance with SDN controller 500 of FIG. 5.

Figure 6:
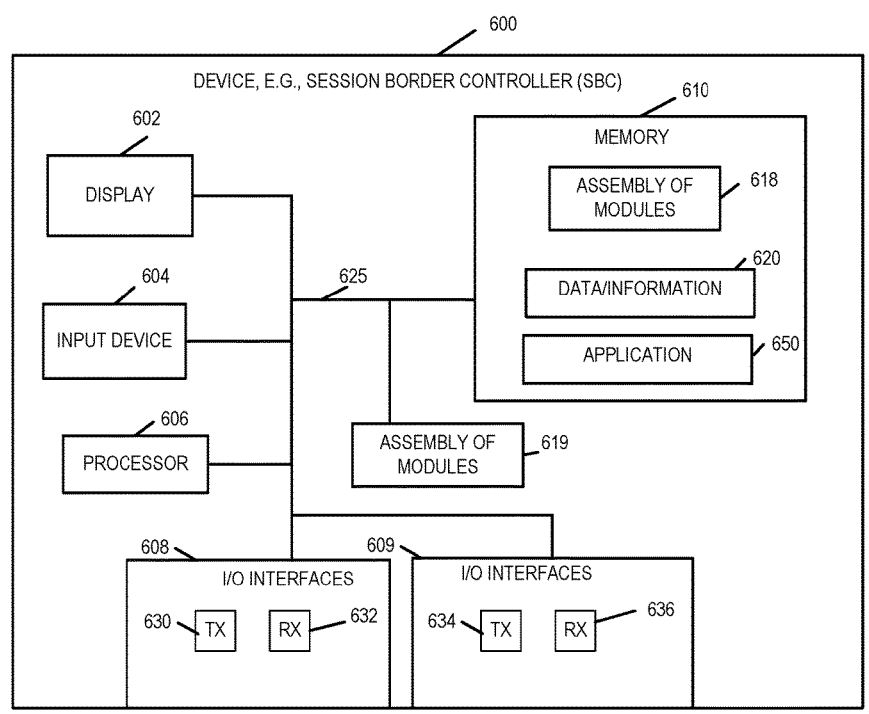
FIG. 6 illustrates an exemplary device illustrated as a session border controller in accordance with one embodiment of the present invention.

FIG. 6 illustrates an exemplary embodiment of a device 600 which in this example is a Session Border Controller (SBC) in accordance with one embodiment of the present invention. Exemplary device 600 includes a display 602, an input device 604, a processor 606, e.g., a CPU, input/output (I/O) interfaces 608 and 609, which couple the device to a SDN network and/or various other devices including for example SDN network controller 202, 402, SBCs 204, 210, and devices 250; memory 610, and an assembly of modules 619, e.g., circuits corresponding to different modules, coupled together via a bus 625 over which the various elements may exchange data and information. Memory 610 includes an assembly of modules 618, e.g., an assembly of software modules, data/information 620, and a software application 640 which is executed by processor 606. The I/O interfaces 608 include transmitters 630 and receivers 632. The I/O interfaces 609 include transmitters 634 and receivers 636. The device 600 is also configured to have a plurality of Internet Protocol (IP) address/port number pairs, e.g., logical IP address/port pairs, for use in exchanging signaling information, e.g., SIP signaling messages for establishing media sessions, and media, e.g., Real-time Transport Protocol packets of a media session. In some embodiments, a single public IP address/port pair is used for all signaling, e.g., SIP signaling relating to establishing sessions. In most, but not all embodiments, the IP/port number pairs used for media sessions are private IP/port number pairs. The signaling IP/port number pair for establishing the session being different from the IP/port number pair used for communicating media of a media session. In some embodiments, the device 600 does not include a display.

The I/O interfaces and transmitters and receivers included therein in some embodiments are configured to communicate in accordance with the Internet Protocol, Transport Control Protocol (TCP), User Datagram Protocol (UDP), Session Initiation Protocol (SIP), Session Description Protocol (SDP), Openflow protocol and/or one or more proprietary signaling protocols. In some embodiments, the device 600 includes a communication module configured to operate using one or more IP, TCP, UDP, SIP, SDP, Openflow and/or proprietary protocol methods. In some embodiments, the communication module is a hardware module, a software module or a module including hardware and software components.

In at least some embodiments, one or more of the I/O interfaces and associated receivers and transmitters are configured to use a protocol/communication mechanism which is proprietary in nature or contains proprietary messages and/or message portions, e.g., fields, to communicate and exchange signals, messages and information with other devices, e.g., SDN controller. In some such embodiments, the protocol can be based on extending a representational state transfer Application Programming Interface (REST API) provided by the SDN Controller to the device 600. In some other embodiments, the protocol can be based on extending a command line interface (CLI) provided by the SDN Controller to the device 600. In yet other embodiment other standard protocols with proprietary extensions are employed for exchanging signaling, messages and information between the device 600 and other devices, e.g., SDN controller. In some embodiments, the device 600 includes a communications module configured to operate in accordance with one or more protocols to communicate with other devices using a REST API or a CLI signaling method. In some embodiments, the communications module is a hardware module, a software module or a module including hardware and software components.

In some embodiments, one or more of SBCs 204, 208, 210, 212, 214, 216 of FIGS. 2 and 3 are implemented as session border controllers in accordance with device 600 of FIG. 6. In some embodiments, one or more of the devices 250, 404, 408, 410, 416 and 418 are implemented in accordance with device 600 of FIG. 6.

Returning now to the method 300 of FIG. 3, the method starts in step 310 when the application 206 of SBC 1 204 generates and transmits a request 302 for a communications path for a communications session/flow to be established between a first Internet Protocol address IP-A and a second Internet Protocol address IP-B to the SDN controller 202. IP-A is an Internet Protocol address assigned to SBC 1 204 and IP-B is an Internet Protocol address assigned to SBC 3 210. The application 206 of SBC 1 204 may, and in some embodiments does, make such a request upon receipt of request at the SBC 1 204 to establish a VOIP communications session/flow with a device external to the network 201 but which is coupled to SBC 3 210. Operation proceeds from step 310 to step 312.

In step 312, the SDN controller 202 receives the request 302. Operation proceeds from step 312 to step 314. In step 314, the SDN controller 202 generates a response 304 and transmits the response to application 206 of SBC 204. The communications path is generated by the SDN controller using information about the network topology and the most current status available regarding the links and devices of the network. The response includes the communications path that is the links/devices which need to be traversed along with a path or flow identifier. In this example, the path identifier-1 is the path identifier. In some embodiments, the SDN controller generates and/or selects an optimum path based on network policies and/or procedures. For example, under one policy the path may be chosen to optimize network utilization. In another example, the policy may dictate the selection of cheapest path as being the optimum path. In another example, the optimum path may be the cheapest path which will provide a certain quality of service (QOS) level. Operation proceeds from step 314 to step 316.

In step 316, the application 206 receives the response 304 and establishes a communications session/flow between SBC 1 204 IP address IP-A and SBC 3 210 IP address IP-B. Operation proceeds from step 316 to step 317. In step 317, the SBC 1 204 performs measurements and generates application level metrics on the communications path established between IP addresses IP-A and IP-B with the path or flow identifier path identifier-1. Application level metrics being metrics generated by application 206 being executing by a processor e.g., processor 606 on SBC 204. The application level metrics are metrics which correspond to activity and performance as measured and/or perceived by the application 206 being executed at the device. In some embodiments, the application 206 of SBC 204 measures the quality of the established communications session or flow based on number of packets exchanged, packet loss, loss rate, discard rate due to late arrival of packets, burst density, gap durations, Mean Opinion Score (MOS) score, Rx factor, jitter, round-trip-time, and number of consecutive packet losses for packet loss periods experienced during the call. The application 206 of SBC 204 also determines in some embodiments, metrics for signaling messages, e.g., by measuring the delay between egressing a session setup request and receipt of the corresponding session answer reply. The raw results of these measurements are used as application level metrics and/or are used to generated application level metrics which provide information about communications session/flow path between IP-A and IP-B assigned path identifier-1. In some embodiments, the application level metrics determined in step 317 are based on load, Quality of Service, and/or financial cost. In some embodiments, the results of multiple measurements are aggregated to generate an aggregated application level metric. Operation proceeds from step 317 to step 318.

In step 318, the application 206 of SBC 204 generates and transmits message 306 which includes metrics for path identifier-1 along with the path identifier-1 to SDN controller 202 specifying the path/flow to which the application level metrics correspond. The application level metrics may be provided in their raw form, e.g., measurement results, or after an aggregation process such as for example wherein the measurement results are combined. While only 1 message including metrics for communications path identified as path identifier-1 is shown multiple messages may be sent while communication session/flow is active and/or at or after the termination of the session. In some embodiments, the application level metrics include time stamps identifying when the time the metrics where generated or measurements upon which the metric is based were performed. This information can be used as a factor by the SDN controller when making determinations based on the metrics. For example older metrics or measurements may be given less weight then more recent metrics received from a different application. Operation proceeds from step 318 to step 320.

In step 320, the SDN controller 202 receives the message 306 with the metrics for the communications path between IP addresses IP-A and IP-B. The SDN controller 202 processes the received message and determines that the application level metrics are for the path/flow assigned to path identifier-1 based on inclusion of the path identifier-1 in the message 306. Operation proceeds from step 320 to step 322.

In step 322, the SDN controller 202 uses the received application level metrics when determining the status of the path between the two IP addresses IP-A and IP-B. When there is a request for a path for the same IP address pair, the SDN controller uses this information among other metrics it gathered to determine which devices need to be traversed for the optimum utilization/quality in accordance with the network policy/procedures. The SDN controller 202 also uses the information from the application level metrics supplied by one or more applications to deduct the status of links by merging or combining multiple metrics/measurements together for multiple paths. Furthermore, the mechanisms described can be used to relay information other than quality of service for example, a SBC detecting attackers based on VoIP signaling/media can transmit the attacker related information to the SDN controller 202.

Figure 4:
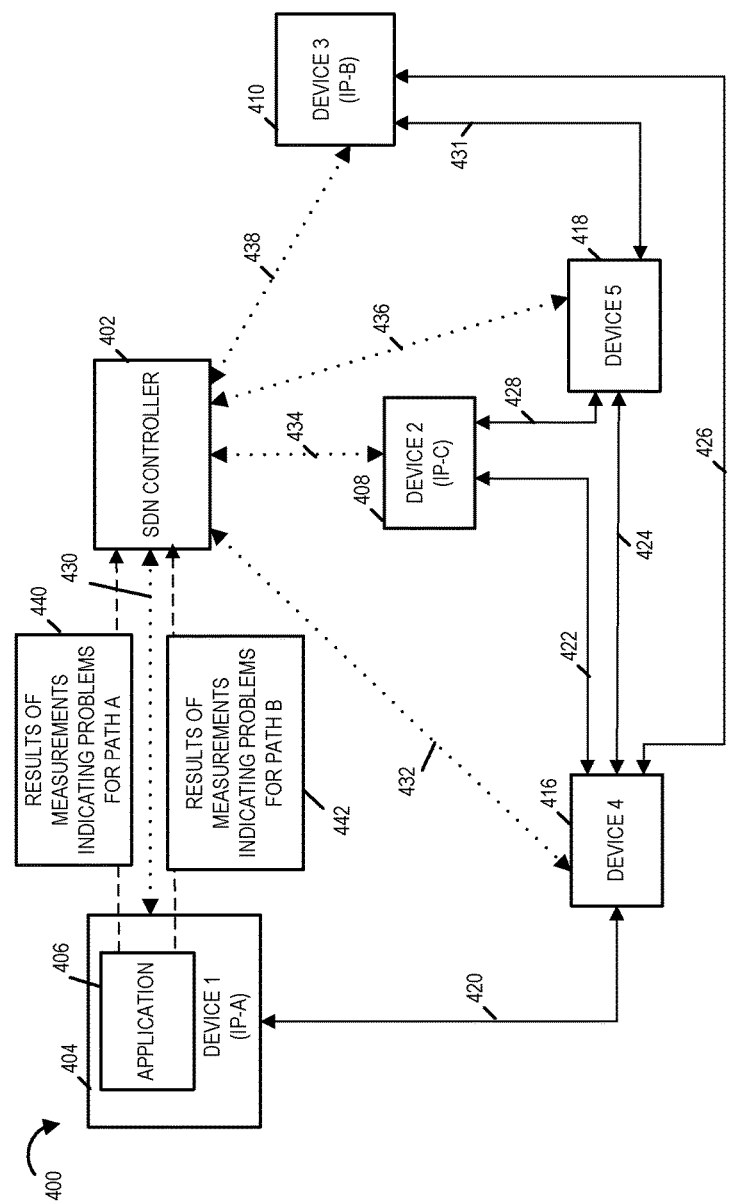
FIG. 4 illustrates the steps and associated signaling exchange between various devices performed in another exemplary communications method in accordance with one exemplary embodiment of the present invention.

FIG. 4 illustrates an exemplary system 400 in accordance with another embodiment of the present invention in which the status of different links in the system is determined based on the results of measurements on multiple paths which are provided to a SDN controller as application level metrics.

For explanatory purposes simplified request and response messages are depicted with the messages and information contained therein illustrated which are most pertinent to explaining the present embodiment of the invention. As it will be appreciated additional information and formatting of the messages as well as the use of additional messages may be and typically is used in initiating and communicating among entities in a SDN system.

The system 400 includes a SDN controller 402, a device 1 404 including a software application 406 being executed by a processor in device 1 404, a device 2 408, a device 3 410, a device 4 416, a device 5 418, communications links 420, 422, 424, 426, 428, and 430, and control channels/links 430, 432, 434, 436, and 438. The SDN controller is implemented in accordance with the SDN controller 500 illustrated in FIG. 5. The device 1 404, device 2 408, device 3 410, device 4 416 and device 5 418 are implemented in accordance with the device 600 illustrated in FIG. 6. In some embodiments, one or more of these devices are Session Border Controllers. Device 1 404 has Internet Protocol address IP-A. The application 406 is the device 600 application 650. The device 3 408 has Internet Protocol address IP-B. Device 2 408 has Internet Protocol address IP-C.

Communications link 420 couples device 1 404 to device 4 416. Communications link 422 couples device 4 416 to device 2 408. Communications link 424 couples device 4 416 to device 5 418. Communications link 426 couples device 4 416 to device 3 410. Communications link 428 couples device 2 408 to device 5 418. Communications link 431 couples device 4 418 to device 3 410. Communications links/control channels 430, 432, 434, 436, and 438 couple device 1 404, device 2 408, device 3 410, device 4 416, and device 5 418 to SDN controller 402 respectively and are used for exchanging control signals and information. In some embodiments, they are logical control channels on physical communications links. Each of the communications links may be, and in some embodiments are, multiple communications links.

The SDN controller 402 controls the forwarding behavior of the elements/devices in the system 400. Applications being executed by the devices 1, 2, 3, 4, and 5 such as for example, application 406 being executed by device 1 404 interact with the SDN controller 402 to setup network paths for their specific needs for example for setting up data flows/sessions through the SDN system.

In the example of FIG. 4, The application 406 of device 1 404 transmits a first request for a media session flow path between device 1's Internet Protocol Address IP-A and device 3's Internet Protocol Address IP-B to the SDN controller 402. This first request is sent over the communications link/control channel 430. The SDN Controller 402 receives the request and determines the communications path A and transmits a response to the application 406 via communications link/control channel 430. The response which is sent by the SDN controller 402 via the control channel 430 includes the communications path/route A between device 1 and device 3 and more particularly between Internet Protocol address IP-A and Internet Protocol address IP-B.

The SDN controller has several communication paths to chose from including: a first communications path including communications link 420, device 4 416, communications link 422, device 2 408, communication link 428, device 5 418 and communications link 430, a second communication path including communications link 420, device 4 416, communications link 424, device 5 418, and communications link 431, and a third communications path including communications link 420, device 4 416, and communications link 426. The SDN controller 402 determines the communication path to be selected for the application based on a variety of factors including the status of the communications links/devices in the communications path to be traversed. In the example the SDN controller chooses the second communications path which includes the communications link 420, device 4 416, communications link 424, device 5 418 and communications link 431. The SDN controller 402 transmits this path which is referred to as path A to the application 406 of device 1 404 over the control channel 430. The application 406 of device 1 404 upon receiving the path A establishes a first media session flow between device 1 404 and device 3 410 and in particular between Internet Protocol address IP-A and Internet Protocol address IP-B. RTP packets of the first media session flow traverse communications link 420, device 4 416, communications link 424, device 5 418 and communications link 431.

Application 460 of device 1 404 transmits a second request to the SDN controller 402 over control channel 430. The second request is for a second media session flow path between device 1 404 and device 2 408 and in particular between Internet Protocol address IP-A and Internet Protocol address IP-C. The SDN 402 has multiple paths to chose from including a first communications path which includes communications link 420, device 4 416, communications link 422; a second communications path including communications link 420, device 4 416, communications path 424, device 5 418, communications link 428; and a third communications path which includes communications link 420, device 4 416, communications link 426, device 3 410, communications link 431, device 5 418 and communications link 428. In this example, the SDN controller 402 chooses the first communications path and transmits the path to the application 406 over the control channel 430 with a path identifier B. Upon receipt of the communications path with the path identifier B from SDN controller 402, the application 406 establishes a second media session flow between Internet Protocol address IP-A of device 1 404 and Internet Protocol address IP-C of device 2 408 using path B. RTP messages of the second media session flow traverse communication link 420, device 4 416, and communications link 422 when being transmitted between Internet Protocol address pairs IP-A and IP-C.

Upon establishment of the first media session flow, the application 406 begins performing measurements of the quality of the established first media session flow. These measurements are based on one or more of the number of packets exchanged, packet loss, loss rate, discard rate due to late arrival of packets, burst density, gap durations, Mean Opinion Score (MOS) score, Rx factor, jitter, round-trip-time, and number of consecutive packet losses for packet loss periods experienced during the call. The raw results of these measurements are used as application level metrics and/or are used to generate application level metrics which provide information about the communications session/flow path A between IP-A and IP-B assigned path identifier A. The device 1 404 transmits the results of the measurements as application level metrics 440 to the SDN controller 402 over control channel 430. The measurement results may be transmitted in raw form and/or in an aggregated or processed form. The application level metrics in this example indicate that there is a problem with path A.

Similar to path A with respect to path B, upon establishment of the second media session flow, the application 406 begins performing measurements of the quality of the established second media session flow between Internet Protocol addresses IP-A and IP-C. These measurements are based on one or more of the number of packets exchanged, packet loss, loss rate, discard rate due to late arrival of packets, burst density, gap durations, Mean Opinion Score (MOS) score, Rx factor, jitter, round-trip-time, and number of consecutive packet losses for packet loss periods experienced during the call. The raw results of these measurements are used as application level metrics and/or are used to generate application level metrics 442 which provide information about the communications session/flow path B between IP-A and IP-C assigned path identifier B. The device 1 404 transmits the results of the measurements as application level metrics 442 to the SDN controller 402 over control channel 430. The measurement results may be transmitted in raw form and/or in an aggregated or processed form. The application level metrics in this example indicate that there is a problem with path B.

The SDN controller 402 processes the application level metrics supplied by the application 406 to deduct the status of links in the SDN system by merging multiple measurements/metrics together. For example, in this case the measurements/metrics received for path A 440 and path B 442 indicate that there is a problem with these paths. The SDN controller 402 by comparing the two paths determines that the link 420 and device 4 416 are common to both paths. The SDN controller 402 then deducts that it is likely that device 4 416 and/or link 420 which is common to both paths is experiencing a problem. The SDN controller 402 can query the status of the device 4 over the control channel 422 and determine that it is functioning without a problem. The SDN controller 402 then further deducts that it is likely or probable that link 420 is experiencing a problem. This mechanism can be, and in most embodiments is, extended to multiple measurements over multiple paths. Various heuristic/statistical approaches can be utilized for aggregation and analysis of the application level metrics to determine the status of links and/or paths in the SDN network.

Figure 7:
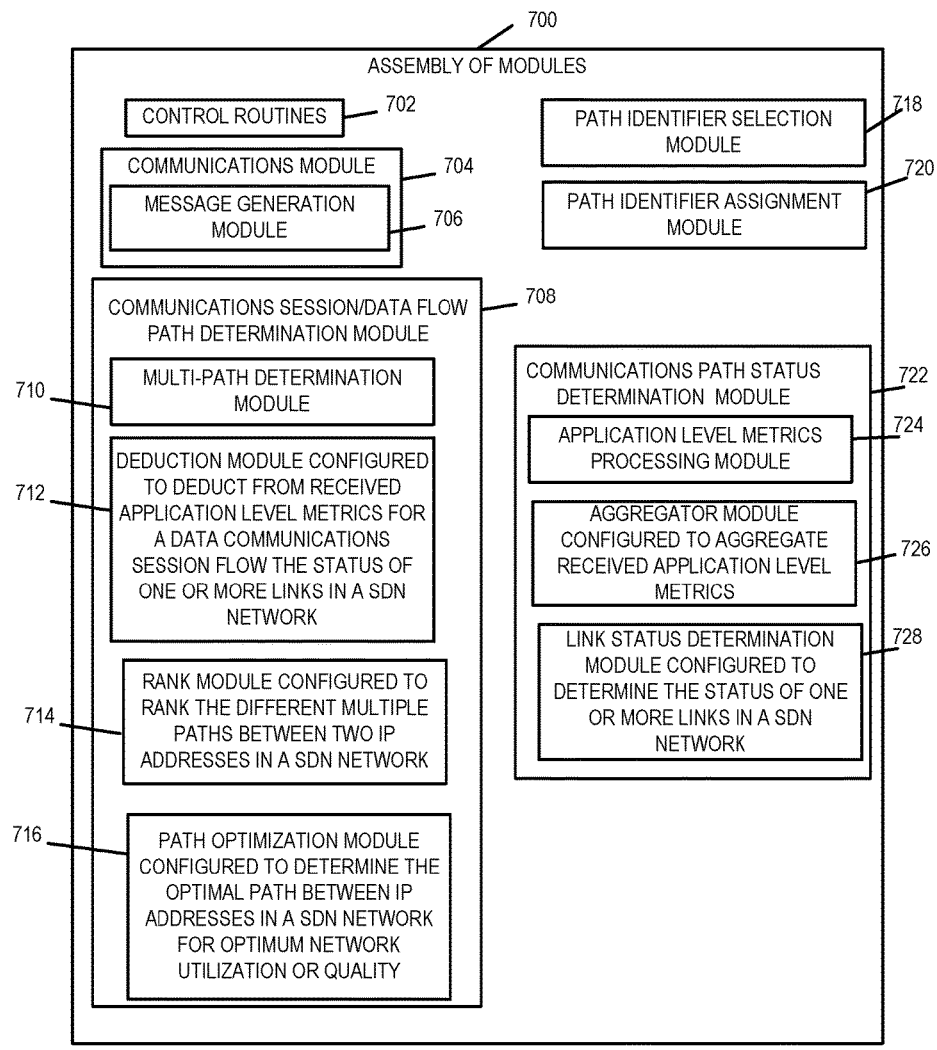
FIG. 7 is an exemplary assembly of modules for a SDN controller in accordance with one embodiment of the present invention.

Assembly of modules 700 illustrated in FIG. 7 is an exemplary assembly of modules in one accordance with one embodiment of the present invention which may be, and in some embodiments is, used in the SDN controller 500 as either the assembly of modules 518 and/or the assembly of module 519. In some embodiments one or more modules of the assembly of modules 700 is included in the assembly of modules 518 and/or the assembly of modules 519. The assembly of modules 700 includes a control routines module 702 configured to control the operation of the SDN controller including for example, the storage of information in records in memory, the I/O Interfaces, receivers and transmitters of the SDN controller; communications module 704 including a message generation module 706; a communications session/data flow path determination module 708; a path identifier selection module 718; a path identifier assignment module 720; and a communications path status determination module 722. The communications session/data flow path determination module 708 includes one or more of the following sub-modules: multi-path determination module 710, deduction module 712 configured to deduct from received application level metrics for a data communications session flow the status of one or more links in a SDN network, a rank module 714 configured to rank the different multiple paths between two Internet Protocol (IP) addresses in a SDN network, a path optimization module 716 configured to determine the optimal path between IP addresses in a SDN network for optimum network utilization and/or quality. The communications path status determination module 722 includes one or more of the following sub-modules: application level metrics processing module 724, aggregator module 726 configured to aggregate received application level metrics, and link status determination module 728 configured to determine the status of one or more links in a SDN network.

Figure 8:
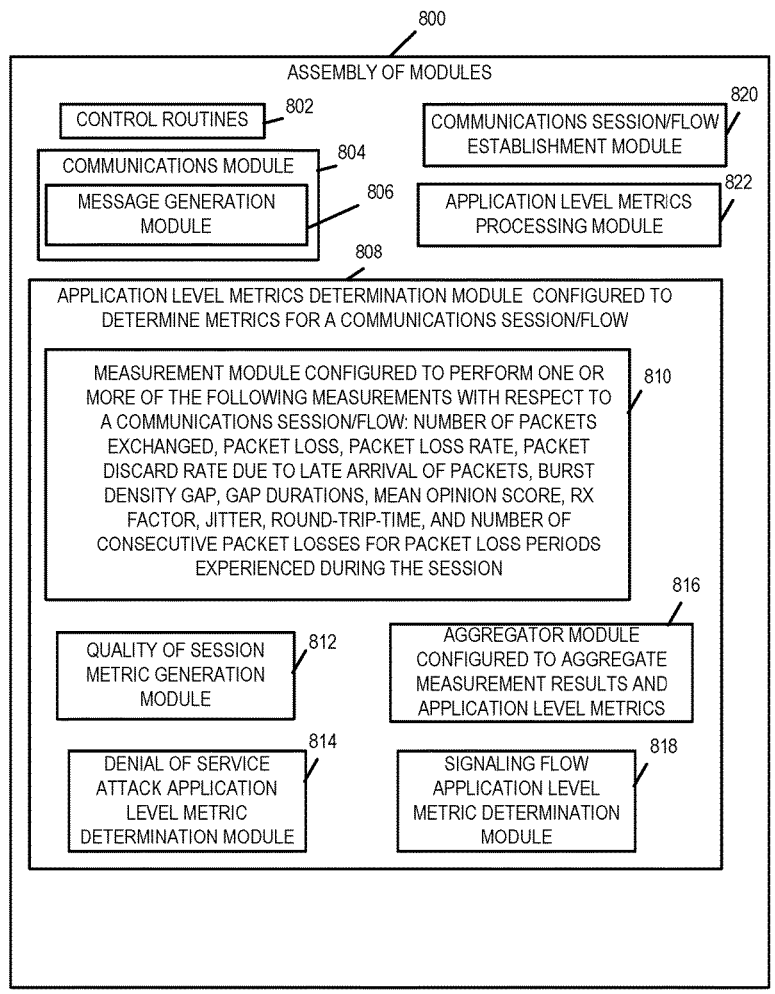
FIG. 8 is an exemplary assembly of modules for a device, e.g., Session Border Controller, in accordance with one embodiment of the present invention

Assembly of modules 800 illustrated in FIG. 8 is an exemplary assembly of modules in accordance with one embodiment of the present invention which may be, and in some embodiments is, used in the device 600 e.g., Session Border Controller 600 as either the assembly of modules 618 and/or the assembly of module 619. In some embodiments one or more modules of the assembly of modules 800 is included in the assembly of modules 618 and/or the assembly of modules 619. The assembly of modules 800 includes a control routines module 802 configured to control the operation of the device, e.g., including for example the storage of information in records in memory, the I/O Interfaces, receivers and transmitters of the device; communications module 804 including a message generation module 806; a communications session/flow establishment module 820; an application level metrics determination module 808 configured to determine metrics for a communications session/flow; and an application level metrics processing module 822. The application level metrics determination module 808 optionally includes one or more of the following sub-modules: measurement module 810 configured to perform one or more of the following measurements with respect to a communications session/flow: number of packets exchanged, packet loss rate, packet discard rate due to late arrival of packets, burst density gap, gap durations, mean opinion score, Rx factor, jitter, round-trip-time, and number of consecutive packet losses for packet loss periods experienced during the session; a quality of session metric generation module 812; a denial of service attack application level metric determination module 814; an aggregator module 816 configured to aggregate measurement results and application level metrics; and a signaling flow application level metric determination module 818.

Figure 9A:
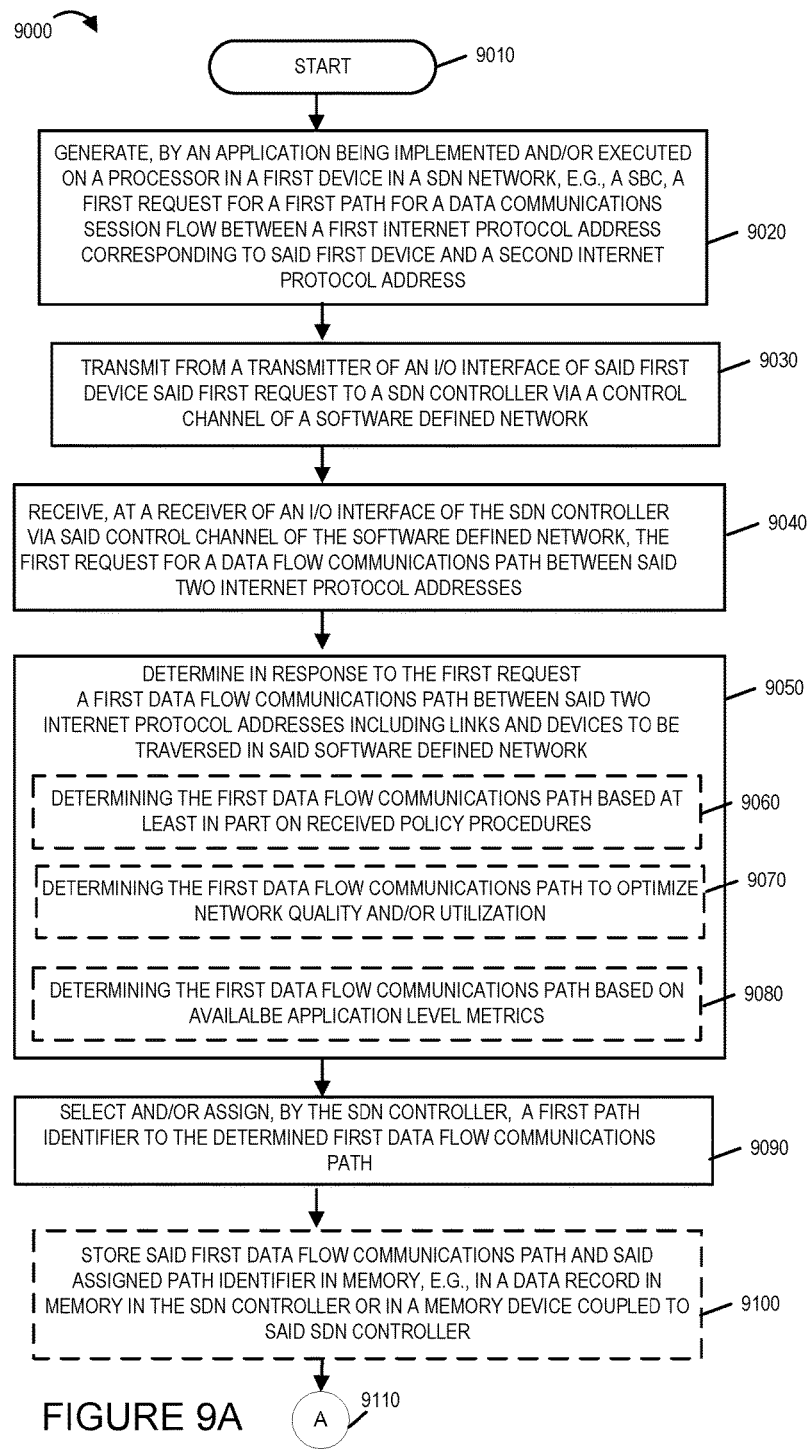
FIG. 9A illustrates a first part of a flowchart showing the steps of an exemplary communications method in accordance with one embodiment of the present invention.
Figure 9B:
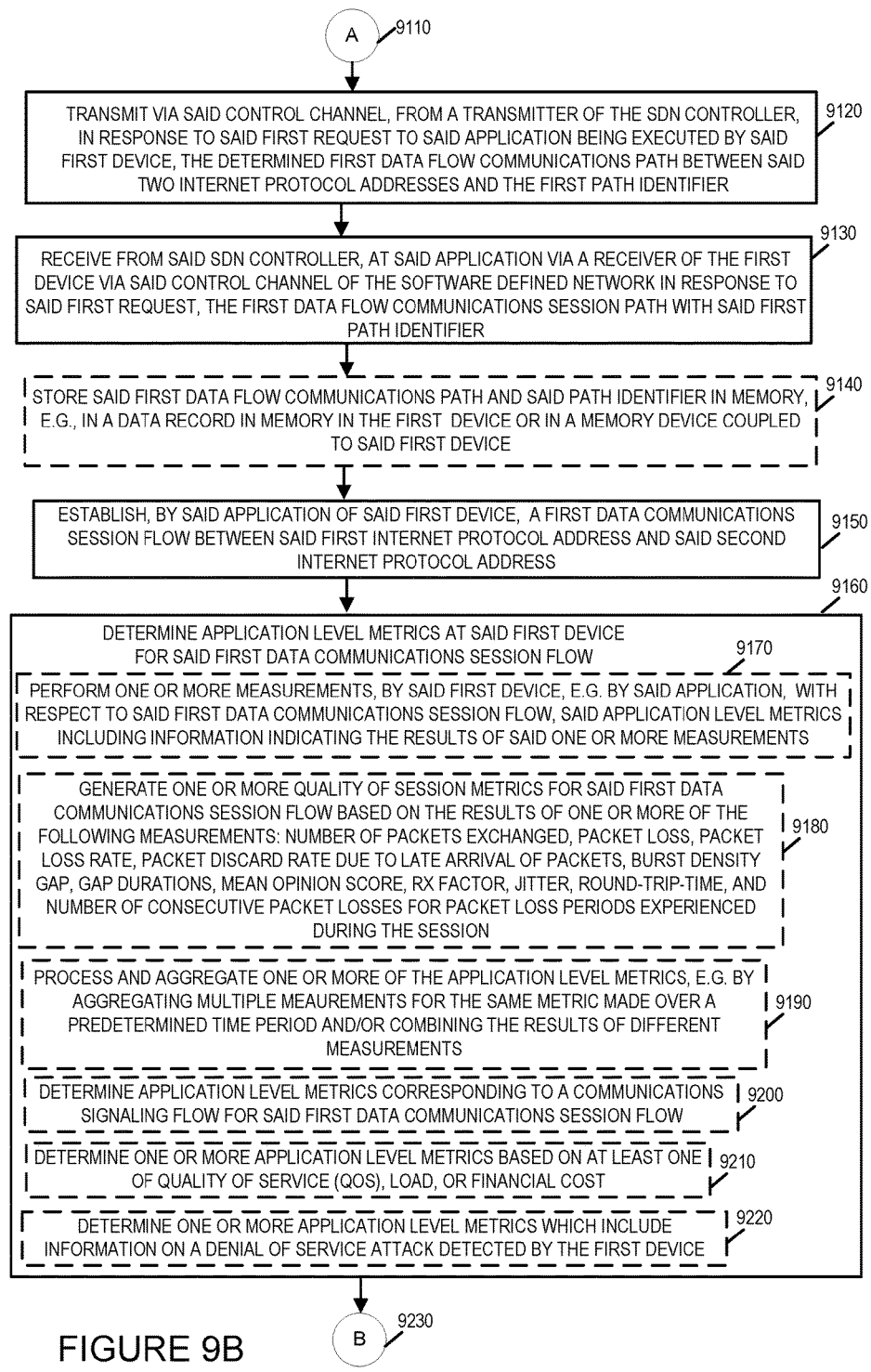
FIG. 9B illustrates a second part of a flowchart showing the steps of the exemplary communications method in accordance with one embodiment of the present invention.
Figure 9C:
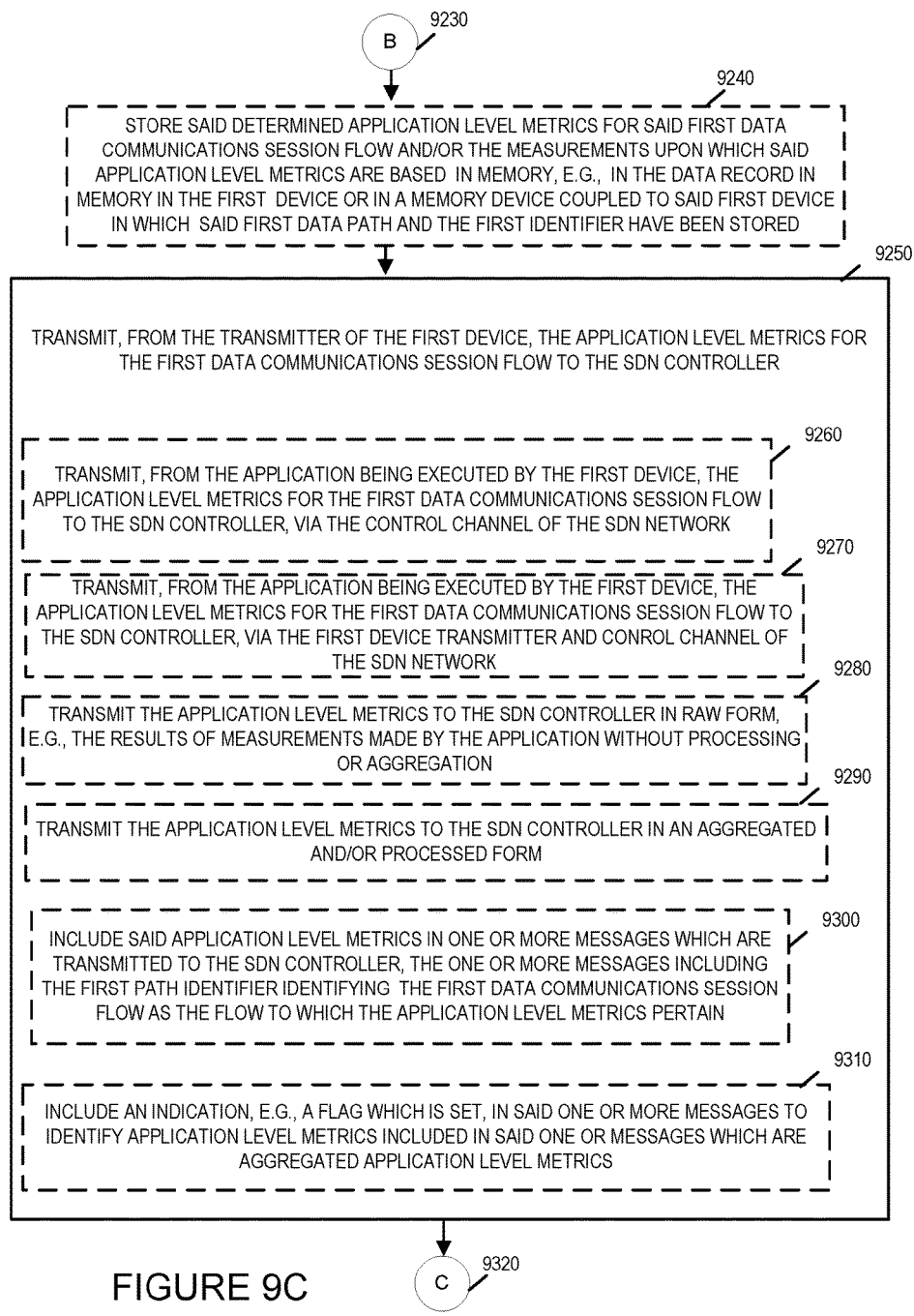
FIG. 9C illustrates a third part of a flowchart showing the steps of the exemplary communications method in accordance with one embodiment of the present invention.
Figure 9D:
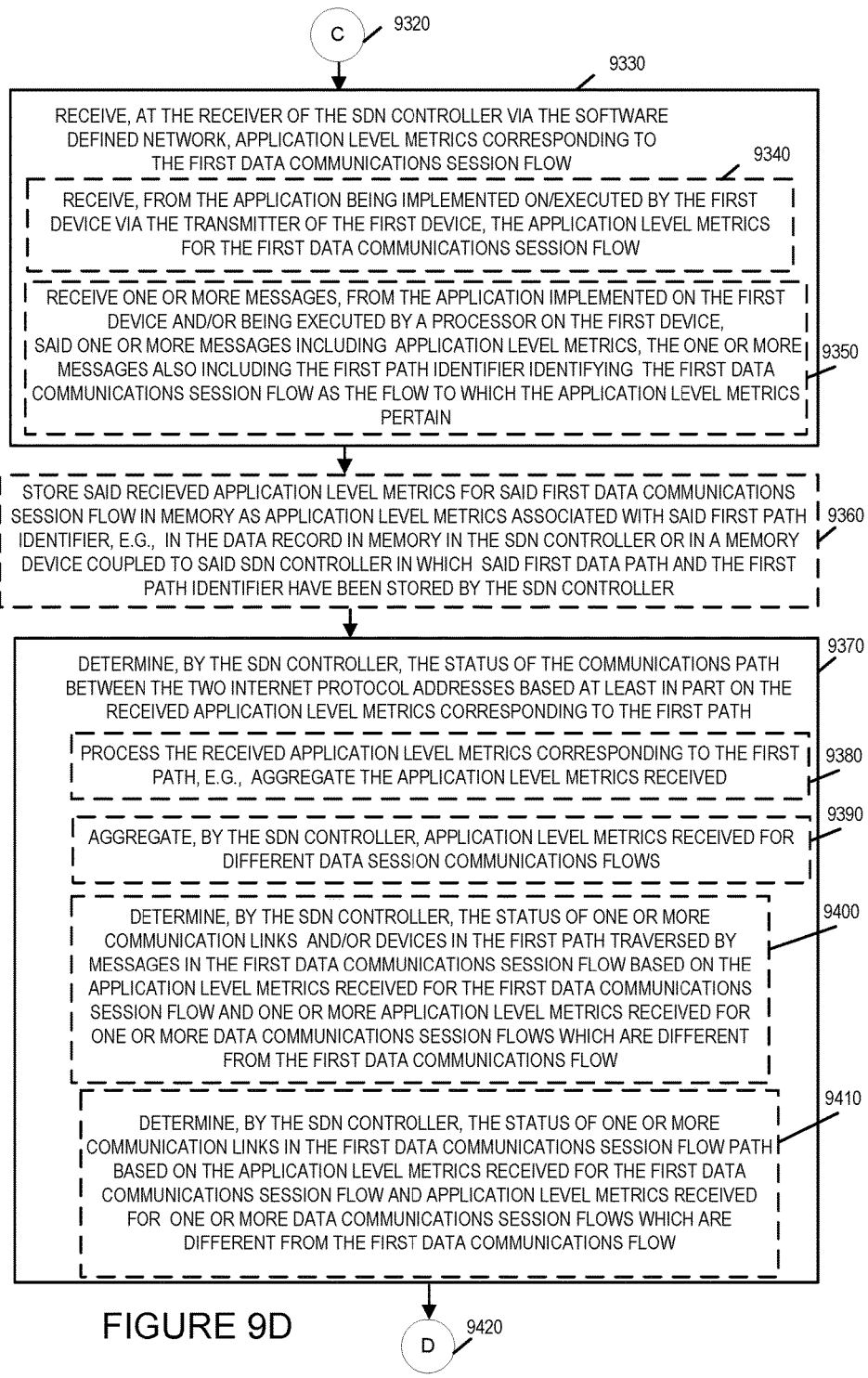
FIG. 9D illustrates a fourth part of a flowchart showing the steps of the exemplary communications method in accordance with one embodiment of the present invention.
Figure 9E:
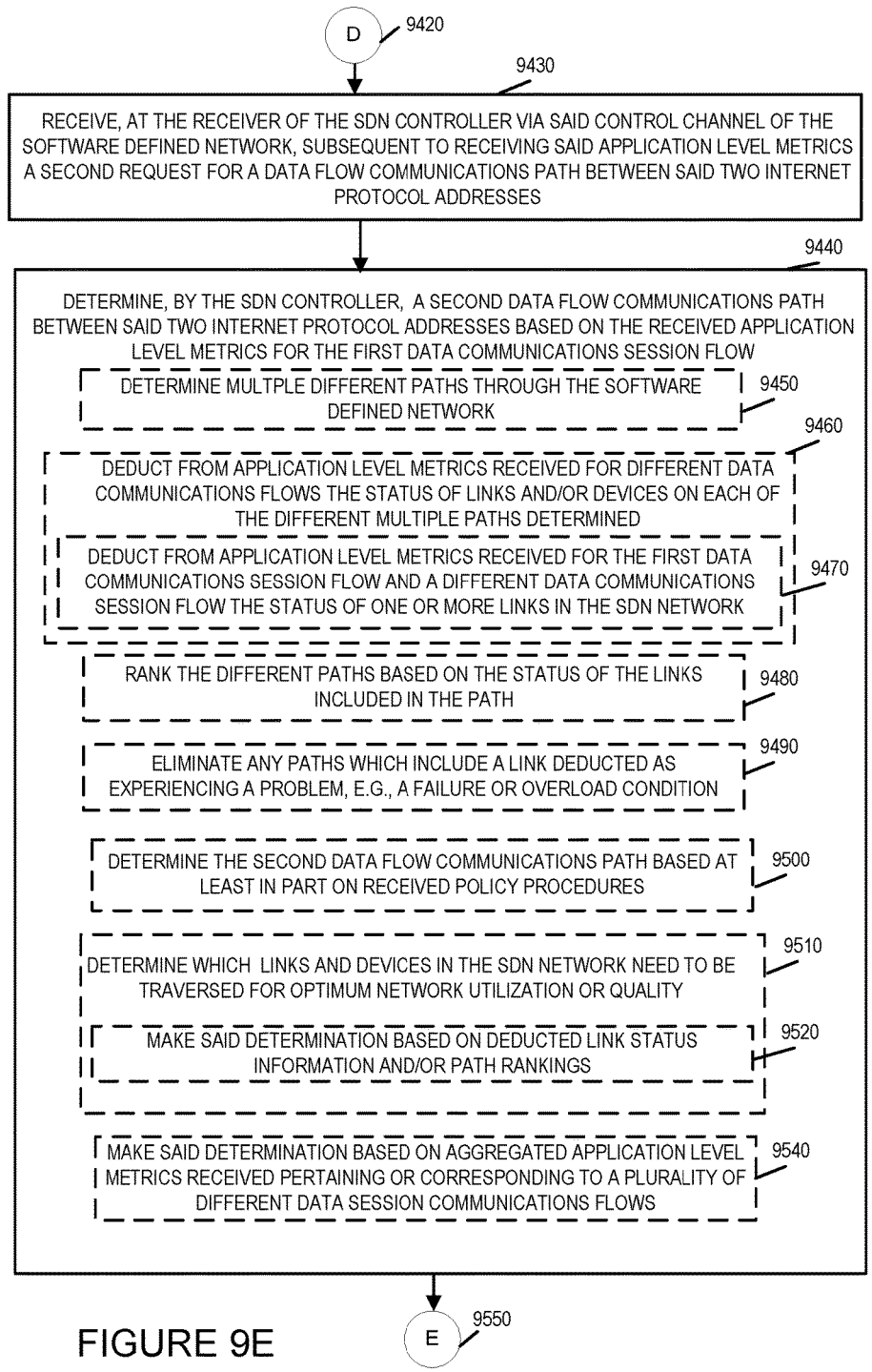
FIG. 9E illustrates a fifth part of a flowchart showing the steps of the exemplary communications method in accordance with one embodiment of the present invention.
Figures 9, 9F:
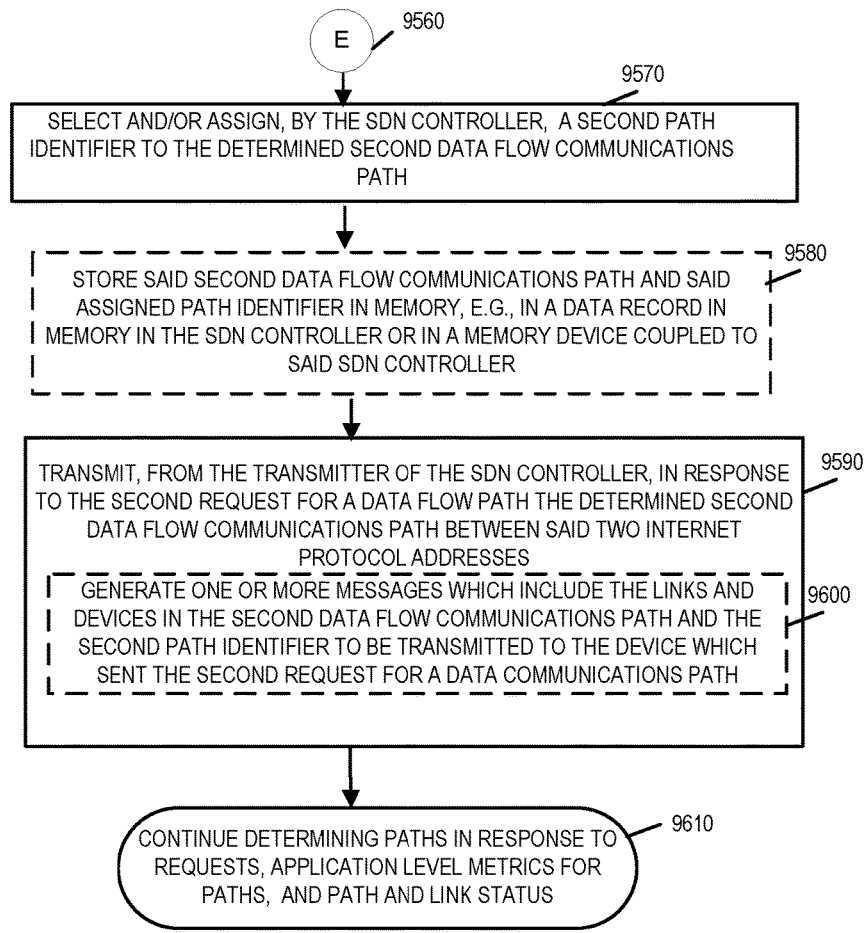
FIG. 9 illustrates the combination of FIGS. 9A, 9B, 9C, 9D, 9E, and 9F.
FIG. 9F illustrates a sixth part of a flowchart showing the steps of the exemplary communications method in accordance with one embodiment of the present invention.

FIG. 9 illustrates the combination of FIGS. 9A, 9B, 9C, 9D, 9E and 9F. FIG. 9A illustrates a first part of a flowchart 9000 showing the steps of an exemplary method of operating a communications system in accordance with one embodiment of the present invention. FIG. 9B illustrates a second part of a flowchart 9000 showing the steps of an exemplary method of operating a communications system in accordance with one embodiment of the present invention. FIG. 9C illustrates a third part of a flowchart 9000 showing the steps of an exemplary method of operating a communications system in accordance with one embodiment of the present invention. FIG. 9D illustrates a fourth part of a flowchart 9000 showing the steps of an exemplary method of operating a communications system in accordance with one embodiment of the present invention. FIG. 9E illustrates a fifth part of a flowchart 9000 showing the steps of an exemplary method of operating a communications system in accordance with one embodiment of the present invention. FIG. 9F illustrates a sixth part of a flowchart 9000 showing the steps of an exemplary method of operating a communications system in accordance with one embodiment of the present invention. For exemplary purposes the method 9000 is explained as implemented on the communications system 200 of FIG. 2.

The method 9000 commences in start step 9010. Operation proceeds from start step 9010 to step 9020. In step 9020, a software application being implemented and/or executed by a processor in a first device, e.g., a Session Border Controller such as SBC 1 204, in a SDN network generates a first request for a first path for a data communications session flow between a first Internet Protocol address and a second Internet Protocol address. The first Internet Protocol corresponding to the first device. The second address may, and in some embodiments does correspond to a second device such as for example SBC 4 212. In some embodiments, the SBC 1 204 and SBC 4 212 are implemented in accordance with the device 600 illustrated in FIG. 6. The software application, e.g., application 650, in some embodiments, generates the first request in response to receiving a request for a data communications session flow, e.g., Voice Over Internet Protocol session using Real-time Transport Protocol (RTP) for the messaging transport protocol and in some embodiments the VOIP session will utilize Real-time Transport Control Protocol (RTCP), from another network or a user equipment device. Operation proceeds from step 9020 to step 9030.

In step 9030, the application transmits from a transmitter (e.g. 630) of an I/O Interface (e.g., 608) of the first device the generated first request to a Software Defined Networking (SDN) controller via a control channel of a software defined network. In some embodiments, the software defined network is a transit network. The SDN controller in this example is SDN controller 202 implemented in accordance with the SDN controller 500 of FIG. 5. The software defined network in this example is SDN network 201 shown in FIG. 2. Operation proceeds from step 9030 to step 9040.

In step 9040, a receiver (532) of an I/O Interface (540) of the SDN controller receives via the control channel of the software defined network, the first request for a data flow communications path between the two Internet Protocol addresses. Operation proceeds from step 9040 to step 9050.

In step 9050, the SDN controller determines in response to the first request a first data flow communications path between the two Internet Protocol Addresses including links and/or devices to be traversed in the software defined network. In some embodiments, step 9050 includes one or more sub-steps 9060, 9070, and 9080.

In sub-step 9060, the SDN controller determines the first data flow communications session path based at least in part on policy procedures it has received. The policy procedures may, and in some embodiments are, received from a policy server not shown in FIG. 2. In some embodiments, the policy procedures may be, and are inputted during setup or during updates. In some embodiments, the policy procedures include rules for determining how to prioritize optimizing network usage and/or quality when generating communications paths through the SDN network.

In sub-step 9070, the first data flow communications session path is determined to optimize network quality and/or utilization.

In sub-step 9080, the first data communications session path is determined based on available application level metrics received from applications regarding one or more paths in the SDN network.

Operation proceeds from step 9050 to step 9090. In step 9090, the SDN controller selects and/or assigns a first path identifier to the determined first data flow communications session path. Operation proceeds from step 9090 to optional step 9100.

In step 9100, the SDN controller stores the first data flow communications session path and the selected and/or assigned path identifier in a memory, e.g., data/information memory portion 520 of memory 510. The first data flow communications session path includes the links and/or devices that the need to be traversed by messages transmitted between the first and second Internet Protocol addresses. In some embodiments, the memory in which the first data flow communications session path and the selected and/or assigned path identifier are stored is a memory device coupled to the SDN controller. In some embodiments, the first data flow communications session path and path identifier are stored in a data record. Operation proceeds from step 9100 to step 9210 shown on FIG. 9B via communications node A 9110.

In step 9120, the SDN controller transmits to the application 650 in response to the first request of the first device the determined first data flow communications session path between the two Internet Protocol addresses and the first path identifier. The first data flow communications session path and the first path identifier are transmitted by transmitter 530 of I/O Interface 540 via the control channel of the SDN network. Operation proceeds from step 9120 to step 9130.

In step 9130, the application 650 on the first device receives from the SDN controller via the control channel of the SDN network in response to the first request the first data flow communications session path with the first path identifier. Operation proceeds from step 9130 to optional step 9140. If optional step 9140 is not implemented operation proceeds from step 9130 to step 9150.

In optional step 9140, the first device stores the first data flow communications session path and first path identifier in memory so that they are available for later use. The memory may be, and in some embodiments is in the first device, e.g., data/information section 620 of memory 610 or in a memory device coupled to the first device. Operation proceeds from step 9140 to step 9150.

In step 9160, the application 650 being implemented and/or executed by the first device establishes a first data communications session flow between the first Internet Protocol address and the second Internet Protocol address using the first data flow communications session path received from the SDN controller. Operation proceeds from step 9150 to step 9160.

In step 9160, application level metrics are determined at the first device for the first data communications session flow. In this example, the application level metrics include metrics determined by the application 650 of the first device which established the first data communications session flow. In some embodiments, step 9160 includes one or more sub-steps 9170, 9180, 9190, 9200, 9210, and 9220 which may be and typically are performed by the application 650.

In sub-step 9170, the first device performs one or more measurements with respect to the first data communications session flow and one or more of the application level metrics determined include information indicating the results of the one or more of the measurements. In some embodiments, the measurements are performed by the application 650 which established the first data communications session flow.

In sub-step 9180, one or more quality of session metrics for the first data communications session flow is generated based on the results of one or more of the following measurements: number of packets exchanged, packet loss, packet loss rate, packet discard rate due to late arrival of packets, burst density gap, gap durations, mean opinion score, Rx factor, jitter, round-trip-time, and number of consecutive packet losses for packet loss periods experienced during the session.

In sub-step 9190, the first device processes and aggregates one or more of the application level metrics, e.g., by aggregating multiple measurements for the same metric over a predetermined time period and/or combining the results of different measurements.

In sub-step 9200, the first device determines one or more application level metrics corresponding to and/or for a communications signaling flow for the first data communications session flow. In some embodiments, the application level metrics corresponding to and/or for the communications signaling flow includes a delay time period, the delay time period being an amount of time between egressing a session setup request for the first data communications session flow and receipt of the corresponding session answer reply for said first data communications session flow.

In sub-step 9210, the first device determines one or more application level metrics based on at least one of quality of service (QoS), load, or financial cost.

In sub-step 9220, the first device determines one or more application level metrics which include information on a denial of service attack detected by the first device.

Operation proceeds from step 9160 to optional step 9240 illustrated on FIG. 9C via connection node B 9230. When optional step 9240 is not implemented operation proceeds from step 9160 to step 9250.

In optional step 9240, the first device stores the determined application level metrics for the first data communications session flow and/or the measurements upon which said application level metrics are based in memory. For example, in the data/information section 610 of memory 610 or in the memory device coupled to the first device in which the first data path and the first identifier have been stored by the first device. In some embodiments, the determined application level metrics for the first data communications session flow and/or the measurements upon which said application level metrics are based are stored in the same record in memory in which the first device stored the first data path and the first path identifier. Operation proceeds from step 9240 to step 9250.

In step 9250, the first device transmits from the transmitter of the first device the application level metrics for the first data communications session flow to the SDN controller. Step 9250 may, and in some embodiments does, include one or more of sub-steps 9260, 9270, 9280, 9290, 9300, and 9310 which are performed by the first device, e.g., the application 650 of the first device.

In sub-step 9260, transmit from the application 650, being executed by the first device the application level metrics for the first data communications session flow to the SDN controller via the control channel of the SDN network and the first device transmitter.

In sub-step 9270, transmit, from the application being executed by the first device, the application level metrics for the first data communications session flow to the SDN controller, via the first device transmitter and the control channel of the SDN network.

In sub-step 9280, transmit the application level metrics to the SDN controller in raw form, e.g., the results of measurements made by the application without processing or aggregation.

In sub-step 9290, transmit the application level metrics to the SDN controller in an aggregated and/or processed form.

In sub-step 9300, include said application level metrics in one or more messages which are transmitted to the SDN controller. The one or more messages including the first path identifier identifying the first data communications session flow as the flow to which the application level metrics pertain.

In sub-step 9310, include an indication, e.g., a flag which is set, in said one or messages to identify application level metrics included in said one or messages which are aggregated application level metrics.

It should be understood that steps 9160, 9240 and 9250 concerning the determination, storing and transmitting of application level metrics by the first device can occur multiple times throughout the duration and at the termination of the first data communications session flow. In some embodiments, for efficiency purposes the application level metrics determined and transmitted to the SDN controller are application level metrics determined for use by the first device and are not application level metrics generated or determined solely for the SDN controller. In other embodiments, the application level metrics are specifically determined and/or generated solely for the exclusive use by the SDN controller. In some embodiments, the SDN controller in response to the first request transmits executable software to the first device including instructions when executed by the first device generates specific application level metrics for the data flow to be established which once determined are to be transmitted back to the SDN controller. In some embodiments, the application level metrics are determined and/or transmitted at specific time intervals. In some embodiments, the application level metrics are continuously determined during the data communications session flow and transmitted after a certain amount of time has passed or a certain number of application level metrics have been determined. In some embodiments, only application level metrics which equal and/or exceed a certain threshold indicating a problem or issue with the first path are communicated to the SDN controller to reduce traffic on the network and more efficiently utilize the control channels. In some embodiments, the SDN controller identifies to the first device, the application level metrics to determine in connection with the data session flow being established and the threshold application level metric values that need to be exceeded before they should be transmitted to the SDN controller. For example, the SDN controller may request that application level metrics for packet loss rate be transmitted to the SDN controller once the rate is above a threshold of 30%.

Operation proceeds from step 9250 to step 9330 shown in FIG. 9D via connection node C 9320.

In step 9330, the application level metrics for and/or corresponding to the first data communications session flow are received at the receiver of the SDN controller via the software defined network. In some embodiments, step 9330 includes sub-steps 9340 and/or 9350. In sub-step 9340, the application level metrics for and/or corresponding to the first data communications session flow are received via the transmitter of the first device from the application 650 being implemented on/executed by the first device by the receiver of the SDN controller. In sub-step 9350, the receiver of the SDN controller receives one or more messages from the application implemented on the first device and/or being executed by a processor on the first device. The one or more messages including application level metrics. The one or more messages also including the first path identifier identifying the first data communications session flow as the flow to which the application level metrics pertain. Operation proceeds from step 9330 to either optional step 9360 or step 9370.

In optional step 9360, the SDN controller stores the received application level metrics for and/or corresponding to the first data communications session flow in memory. For example, in the data record in memory in the SDN controller or in a memory device coupled to said SDN controller in which said first data path and the first path identifier have been stored by the SDN controller. Operation proceeds from step 9360 to step 9370.

In step 9370, the SDN controller determines the status of the communications path between the two Internet Protocol addresses based at least in part on the received application level metrics corresponding to the first data communications session flow path. In some embodiments, step 9370 includes one or more of sub-step 9380, 9390, 9400 and 9410.

In sub-step 9380, the SDN controller processes the received application level metrics for and/or corresponding to the first data communications session flow path, e.g., by aggregating two or more of the application level metrics received.

In sub-step 9390, the SDN controller aggregates application level metrics received for and/or corresponding to different data session communications flows.

In sub-step 9400, the SDN controller determines the status of one or more communications links and/or devices in the first data communications session flow path based on the application level metrics received for the first data communications session flow and one or more application level metrics received for one or more data communications session flows which are different from the first data communications session flow.

In sub-step 9410, the SDN controller determines the status of one or more communications links in the first data communications session flow path based on the application level metrics received for the first data communications session flow and application level metrics received for one or more data communications session flows which are different from the first data communications session flow. In some embodiments, the determination is also based on not receiving a response to one or more SDN device status query messages sent to one or more devices in the first data communications session flow path within a predetermined period of time Operation proceed from step 9370 to step 9430 shown on FIG. 9E via connection node 9420.

In step 9430, the receiver of the SDN controller receives via the control channel of the software defined network, subsequent to receiving said application level metrics a second request for a data flow communications path between said two Internet Protocol addresses. For example, the application 650 or another application being executed on the first device may request a path for a second VOIP call. The two Internet Protocol addresses for the first and second VOIP calls may be the same but different ports may be used by the devices with the same IP addresses. Alternatively, the second request could be received after the termination of the first data communications session flow. Operation proceeds from step 9430 to step 9440.

In step 9440, the SDN controller determines a second data flow communications path between said two Internet Protocol addresses based on the received application level metrics for the first data communications session flow. The second data flow communications path may be, and in some embodiments is, the same as the first data flow communications path. The second data flow communications session path includes the communications links and/or devices which are to be traversed by messages in the second data flow communications session path when transmitted between the two Internet Protocol addresses. In some embodiments, the step 9440 includes one or more sub-steps 9450, 9460, 9470, 9480, 9490 9500, 9510, 9520, and 9540.

In sub-step 9450, the SDN controller determines multiple different paths between the two Internet Protocol addresses through the software defined network.

In sub-step 9460, the SDN controller deducts from application level metrics received for different data communications flows the status of links and/or devices on or more of the different multiple paths determined. In some embodiments, the SDN controller deducts from application level metrics received for different data communications flows the status of links and/or devices on each of the different multiple paths determined by the SDN controller. In some embodiments, sub-step 9460 includes sub-step 9470. In sub-step 9470, the SDN controller deducts from application level metrics for and/or corresponding to the first data communications session flow and a different data communications session flow the status of one or more links in the SDN network.

In sub-step 9480, the SDN controller ranks the different paths based on the status of the links included in the path. For examples, the more optimal the path for network utilization or quality the higher the ranking.

In sub-step 9490, the SDN controller eliminate any paths which include a link deducted as experiencing a problem, e.g., a failure or overload condition.

In sub-step 9500, the SDN controller determines the second data flow communications path based at least in part on received policy procedures.

In sub-step 9510, the SDN controller determines which links and/or devices in the SDN network need to be traversed for optimum network utilization or quality. In some embodiments sub-step 9510 includes sub-step 9520. In sub-step 9520, the determination of which links and/or devices in the SDN network need to be traversed for optimum network utilization or quality is made based on deducted link status information and/or path rankings.

In sub-step 9540, the SDN controller makes the determination of the second data flow communications path between the two Internet Protocol addresses based on aggregated application level metrics received pertaining or corresponding to a plurality of different data session communications flows.

In some embodiments, the step 9440 uses the status of the communications path between the two Internet Protocol addresses determined in step 9370 in making the determination.

In some embodiments, the SDN controller generates and stores in memory the status of the links and/or devices in the SDN network on a real-time on-going basis and updates the status of the links as new application level metrics are received at the SDN controller. The SDN controller in some such systems determines the second data flow communications path from the status of the links and/or devices in the network stored in memory.

Operation proceeds from step 9440 to step 9570 shown in FIG. 9F via connection node E 9560.

In step 9570, the SDN controller selects and/or assigns a second path identifier to the determined second data flow communications path. Operation proceeds from step 9570 to optional step 9580 or step 9590.

In optional step 9580, the SDN controller stores the second data flow communications path and the selected and/or assigned second path identifier in memory for future use for example for use by the SDN controller in identifying which application levels metrics correspond to and/or are for which path and in turn which links and/or devices are in that path. In some embodiments, the memory may be, and is in the data/information section 520 of memory 510 of the SDN controller. In other embodiments, the memory may be coupled to the SDN controller as previously discussed in connection with the storage of the first data flow communications path and first path identifier. In most instances the memory used for the first and second data flow communication path information storage will be the same. The second data flow communication path and selected and/or assigned second path identifier may be, and typically are, stored together in a data record. In some embodiments, the path identifier stored in the record is used as an index for identifying the data record among a plurality of data records for different paths determined by the SDN network. Operation proceeds from step 9580 to step 9590.

In step 9590, the SDN controller transmits from the transmitter of the SDN controller in response to the second request for a data flow path the determined second data flow communications path between the two Internet Protocol addresses. In some embodiments, the step 9590 includes sub-step 9600. In sub-step 9600, the SDN controller generates one or more messages which include the links and/or devices in the second data flow communications path and the second path identifier to be transmitted to the device which sent the second request for a data communications path. Operation proceeds from step 9600 to step 9610. In step 9160 the method 9000 continues with the SDN controller continuing to determine paths in response to requests, the devices of the SDN network such as the SBCs continue determining application level metrics for paths which they are utilizing for sessions or flows, and SDN controller continues determining path and link status information based on the received application level metrics as previously described in connection with the first and second requests, paths and application level metrics.

The method 9000 of FIG. 9 illustrates how various embodiments of the invention may be used by a SDN controller to determine based on application level metrics the status of paths and/or links in a software defined networking environment such as the SDN network 201 of FIG. 2 allowing for improved and more optimal routing of traffic flows. The method 9000 illustrates methods of operating devices of the SDN network such as SBCs and SDN controllers to achieve higher efficiency and more optimal network utilization and/or quality.

Another exemplary embodiment of the invention is a method of operating a software defined networking (SDN) controller in a software defined network, the method comprising: receiving, at a receiver of the SDN controller via said software defined network, application level metrics corresponding to a data communications session flow; and determining, by the SDN controller, the status of a communications path between two Internet Protocol addresses based on the received application level metrics. This method may, and in some embodiments does include one or more of the features listed below.

In some embodiments, the at least some of said application level metrics cannot be measured by said SDN controller. In some embodiments, none of the application level metrics can be measured by said SDN controller. In some embodiments, the application level metrics are received from one or more different software applications implemented on different devices traversed by messages in the data communications session flow. In some such embodiments, the at least some of said application level metrics are received from a software application implemented on (executed by) a device at the edge of the software defined network and includes information indicating the results of a measurement made at the device at the edge of the network by the software application. In some of those embodiments, the device at the edge of the software defined network is a Session Border Control.

The application level metrics typically include the results of measurements made by a software application at a device on the edge of the software defined network. In some embodiments, the data communications session flow is a Voice Over Internet Protocol communications session flow. In some embodiments, the application level metrics include information on a denial of service attack detected by said software application. In some embodiments, the data communications session flow is a media flow, e.g., a audio flow, containing RTP messages.

In some embodiments of the method, the one or more of the application level metrics is based on at least one of Quality of Service (QoS), load, or financial cost.

In some embodiments, the application level metrics includes one or more quality of session metrics based on one or more of the following: number of packets exchanged, packet loss, loss rate, discard rate due to late arrival of packets, burst density gap, gap durations, Mean Opinion Score (MOS) score, Rx factor, jitter, round-trip-time, and number of consecutive packet losses for packet loss periods experienced during the session.

The method may also including the further step of receiving, at the receiver of the SDN controller, application level metrics corresponding to a communications signaling flow for the data communications session flow. In some such method embodiments, the application level metrics corresponding to a communications signaling flow for said data communications session flow includes a delay time period, said delay time period being an amount of time between egressing a session setup request for said data communications session flow and receipt of the corresponding session answer reply for said data communications session flow.

In some of the embodiments, the application level metrics for the data communications flow are for the communications path between the two Internet Protocol addresses.

In some method embodiments, the method further comprises receiving, at a receiver of the SDN controller via said software defined network subsequent to receiving said application level metrics, a request for a data flow communications path between said two Internet Protocol addresses; determining said data flow communications path between said two Internet Protocol addresses based on said application level metrics; and transmitting, from a transmitter of the SDN controller, in response to said request for a data flow path the determined data flow communications path between said two Internet Protocol addresses.

In some embodiments, the two Internet Protocol addresses correspond to different Session Border Controllers (SBCs) and the path between the two Internet Protocol addresses is a path between said two SBCs.

In some embodiments, the step of determining said data flow communications path between said two Internet Protocol addresses based on said application level metrics includes determining which links and devices in the software defined network need to be traversed for optimum network utilization or quality.

The some embodiments, the step of determining said data flow communications path between said two Internet Protocol addresses includes: determining multiple different paths through the software defined network; deducting from application level metrics received for different data communications flows the status of links on each of the different multiple paths determined; and eliminating any paths which include a link deducted as experiencing a problem.

In some embodiments, the determining said data flow communications path between said two Internet Protocol addresses is further based on aggregated application level metrics received pertaining to a plurality of different data session communications flows.

In some embodiments, the at least some of said plurality of different data session communications flows correspond to different communications paths or devices. In some of such embodiments, the SDN controller aggregates said application level metrics received pertaining to different data session communications flows.

In some embodiments, the application level metrics are included in one or more messages, said one or more messages including a data communications session flow identifier, said data communications session flow identifier identifying the data communications session flow to which the application level metrics pertain. In most but not all embodiments, the data communications session flow identifier is selected by said SDN controller. In some of such embodiments, the data communications session flow identifier is transmitted from said transmitter in response to a request for a data communications session flow path. In some embodiments, the one or more messages further includes a flag indicating whether the application level metrics included in the one or more messages are aggregated application level metrics.

Another exemplary method in accordance with the present invention is a method of operating a Session Border Controller (SBC) in a software defined network (SDN), the method including: transmitting from a transmitter in the Session Border Controller to a SDN network controller a request for a path for a data communications session flow between a first Internet Protocol address corresponding to said SBC and a second Internet Protocol address; receiving at a receiver of the SBC a data communications session flow path with a data communications session flow identifier in response to said request; determining application level metrics at said SBC for said data communications flow; and transmitting from said transmitter in the Session Border Controller the application level metrics to the SDN controller. In some embodiments, the application level metrics include the results of measurements made by the Session Border Controller. In some embodiments, at least some of said measurements cannot be made by said SDN controller. In some embodiments, the at least some of said application level metrics are transmitted in raw form while in some other embodiments, at least some of said application level metrics are transmitted after an aggregation process has been performed by the Session Border Controller. The application level metrics may, and in some embodiments do, include one or more quality of session metrics based on the results of one or more of the following measurements: number of packets exchanged, packet loss, loss rate, discard rate due to late arrival of packets, burst density gap, gap durations, Mean Opinion Score (MOS) score, Rx factor, jitter, round-trip-time, and number of consecutive packet losses for packet loss periods experienced during the session.

In some embodiments, the step of transmitting from said transmitter in the Session Border Controller the application level metrics to the SDN controller includes transmitting one or more messages that include the application level metrics, said one or more messages including the data communications session flow identifier. The one or messages may, and in some embodiments do, include a flag indicating that the application level metrics are aggregated application level metric when said application level metrics are aggregated application level metrics.

In most but not all embodiments, the data communications session flow identifier is selected by said SDN controller. In some of such embodiments, the data communications session flow identifier is transmitted from said transmitter in response to a request for a data communications session flow path. In some embodiments, the one or more messages further includes a flag indicating whether the application level metrics included in the one or more messages are aggregated application level metrics.

Various apparatus embodiments of the invention will now be discussed.

An apparatus embodiment 1, the apparatus embodiment 1 including a software defined networking (SDN) controller comprising: a receiver for receiving via a software defined network application level metrics corresponding to a data communications session flow; and a processor configured to control the SDN controller to determine the status of a communications path between two Internet Protocol addresses based on the received application level metrics.

An apparatus embodiment 1A including the apparatus embodiment 1 and wherein at least some of said application level metrics cannot be measured by said SDN controller.

An apparatus embodiment 1AA including the apparatus embodiment 1A and wherein none of the application level metrics can be measured by said SDN controller.

An apparatus embodiment 1B including the apparatus embodiment 1 and wherein said receiver is also for receiving said application level metrics from one or more different software applications implemented on different devices traversed by messages in the data communications session flow.

An apparatus embodiment 1BB including the apparatus embodiment 1B and wherein said receiver is also for receiving at least some of said application level metrics from a software application implemented on (executed by) a device at the edge of the software defined network and include information indicating the results of a measurement made at the device at the edge of the network by the software application.

An apparatus embodiment 1BBB including the apparatus embodiment 1BB and wherein said device at the edge of the software defined network is a Session Border Control.

An apparatus embodiment 1C including the apparatus embodiment 1 and wherein said application level metrics include the results of measurements made by a software application at a device on the edge of the software defined network.

An apparatus embodiment 1CC including apparatus embodiment 1 and wherein said device is a SBC.

An apparatus embodiment 1CCC including the apparatus embodiment 1CC and wherein said data communications session flow is a Voice Over Internet Protocol communications session flow and said application level metrics include information on a denial of service attack detected by said software application.

An apparatus embodiment 2 including the apparatus embodiment 1 and wherein one or more of said application level metrics is based on at least one of Quality of Service (QoS), load, or financial cost.

An apparatus embodiment 3 including the apparatus embodiment 1 and wherein said application level metrics include a quality of session metric based on one or more of the following: number of packets exchanged, packet loss, loss rate, discard rate due to late arrival of packets, burst density gap, gap durations, Mean Opinion Score (MOS) score, Rx factor, jitter, round-trip-time, and number of consecutive packet losses for packet loss periods experienced during the session.

An apparatus embodiment 4 including the apparatus embodiment 3 and wherein said receiver is also for receiving application level metrics corresponding to a communications signaling flow for said data communications session flow.

An apparatus embodiment 4A including the apparatus embodiment 4 and wherein said application level metrics corresponding to a communications signaling flow for said data communications session flow includes a delay time period, said delay time period being an amount of time between egressing a session setup request for said data communications session flow and receipt of the corresponding session answer reply for said data communications session flow.

An apparatus embodiment 5 including the apparatus embodiment 1 and wherein said application level metrics for the data communications flow are for the communications path between said two Internet Protocol addresses.

An apparatus embodiment 6 including the apparatus embodiment 1 and further including a transmitter and wherein: said receiver is also for receiving a request for a data flow communications path between said two Internet Protocol addresses via said software defined network subsequent to receiving said application level metrics; and said processor is further configured to control said SDN controller to determine said data flow communications path between said two Internet Protocol addresses based on said application level metrics and to operate said transmitter in response to said request for a data flow path to transmit the determined data flow communications path between said two Internet Protocol addresses.

An apparatus embodiment 6A including the apparatus embodiment 6 and wherein the two Internet Protocol addresses correspond to different Session Border Controllers (SBCs) and wherein the path between the two Internet Protocol addresses is a path between said two SBCs.

An apparatus embodiment 7 including the apparatus embodiment 6 and wherein said processor is further configured to control said SDN controller to determine which links and devices in the software defined network need to be traversed for optimum network utilization or quality as part of said operation to determine said data flow communications path between said two Internet Protocol addresses based on said application level metrics.

An apparatus embodiment 8 including the apparatus embodiment 7 and wherein said processor is further configured to control said SDN controller to determine which links and devices in the software defined network need to be traversed for optimum network utilization or quality as part of said operation to determine said data flow communications path between said two Internet Protocol addresses based on said application level metrics includes said processor being configured to control said SDN controller to: determine multiple different paths through the software defined network; deduct from application level metrics received for different data communications flows the status of links on each of the different multiple paths determined; and eliminate any paths which include a link deducted as experiencing a problem.

An apparatus embodiment 9 including the apparatus embodiment 6 and wherein said processor is further configured to control said SDN controller to determine said data flow communications path between said two Internet Protocol addresses also based on aggregated application level metrics received pertaining to a plurality of different data session communications flows.

An apparatus embodiment 9A including the apparatus embodiment 9 and wherein at least some of said plurality of different data session communications flows correspond to different communications paths or devices.

An apparatus embodiment 9B including the apparatus embodiment 9A and wherein said processor is further configured to control said SDN controller to aggregate said application level metrics received pertaining to different data session communications flows.

An apparatus embodiment 10 including the apparatus embodiment 1 and wherein said application level metrics are included in one or more messages, said one or more messages including a data communications session flow identifier, said data communications session flow identifier identifying the data communications session flow to which the application level metrics pertain.

An apparatus embodiment 10A including the apparatus embodiment 10 and wherein said processor is further configured to control said SDN controller to select said data communications session flow identifier in response to receiving a request for a data flow communications path for said data communications session flow.

An apparatus embodiment 10B including the apparatus embodiment 10A and further including a transmitter for transmitting in response to said request for a data communications session flow path said data communications session flow identifier.

An apparatus embodiment 11 including the apparatus embodiment 10 and wherein said one or more messages further includes a flag indicating whether the application level metrics included in the one or more messages are aggregated application level metrics.

An apparatus embodiment 12, the apparatus embodiment 12 including a Session Border Controller (SBC) comprising: a transmitter for transmitting from the Session Border Controller to a SDN network controller a request for a path for a data communications session flow between a first Internet Protocol address corresponding to said SBC and a second Internet Protocol address; a receiver for receiving a data communications session flow path with a data communications session flow identifier in response to said request; a processor configured to control said Session Border Controller to determine application level metrics at said SBC for said data communications flow; and said transmitter configured to transmit said application level metrics to the SDN controller.

An apparatus embodiment 13 including the apparatus embodiment 12 and wherein said application level metrics include the results of measurements made by the Session Border Controller.

An apparatus embodiment 13A including the apparatus embodiment 12 and wherein at least some of said measurements cannot be made by said SDN controller.

An apparatus embodiment 13B including the apparatus embodiment 12 and wherein said transmitter is configured to transmit at least some of said application level metrics in raw form.

An apparatus embodiment 13C including the Session Border Controller of apparatus embodiment 12 and wherein said transmitter is configured to transmit at least some of said application level metrics after an aggregation process has been performed by the Session Border Controller.

An apparatus embodiment 13D including the Session Border Controller of apparatus embodiment 13C and wherein said processor is further configured to perform an aggregation process on at least some of said application level metrics.

An apparatus embodiment 14 including the Session Border Controller of apparatus embodiment 13 and wherein said application level metrics include one or more quality of session metrics based on the results of one or more of the following measurements: number of packets exchanged, packet loss, loss rate, discard rate due to late arrival of packets, burst density gap, gap durations, Mean Opinion Score (MOS) score, Rx factor, jitter, round-trip-time, and number of consecutive packet losses for packet loss periods experienced during the session.

An apparatus embodiment 15 including the Session Border Controller of apparatus embodiment 12 and wherein said transmitter is further configured to transmit said application level metrics to the SDN controller using one or more messages that include the application level metrics, said one or more messages including the data communications session flow identifier.

An apparatus embodiment 15A including the Session Border Controller of apparatus embodiment 15 and wherein said one or messages include a flag indicating that the application level metrics are aggregated application level metrics when said application level metrics are aggregated application level metrics.

The invention is also applicable to embodiments in which a non-transitory computer readable medium includes processor executable instructions that when executed control one or more processors in a SDN controller device or an apparatus such as for example a SBC to perform one or more of the aforementioned method steps, e.g., the steps of method 900.

In another exemplary embodiment of the invention, a non-transitory computer readable medium includes processor executable instructions for use in a SDN controller, the instructions which when executed by at least one processor in the SDN controller control the SDN controller to: receive at a receiver of the SDN controller via a software defined network application level metrics corresponding to a data communications session flow; and to determine the status of a communications path between two Internet Protocol addresses based on the received application level metrics. In some such embodiments, the one or more of said application level metrics is based on at least one of Quality of Service (QoS), load, or financial cost. In some embodiments, the application level metrics include a quality of session metric based on one or more of the following: number of packets exchanged, packet loss, loss rate, discard rate due to late arrival of packets, burst density gap, gap durations, Mean Opinion Score (MOS) score, Rx factor, jitter, round-trip-time, and number of consecutive packet losses for packet loss periods experienced during the session.

In another exemplary embodiment of the invention, a non-transitory computer readable medium includes processor executable instructions for use in a device, e.g., a SBC, the instructions which when executed by at least one processor in the device, e.g., SBC control the device, e.g., SBC to: transmit from a transmitter of the device to a SDN network controller a request for a path for a data communications session flow between a first Internet Protocol address corresponding to said device and a second Internet Protocol address; receive at a receiver of the device a data communications session flow path with a data communications session flow identifier in response to said request; determine application level metrics at said device for said data communications flow; and transmit from the transmitter of the device the application level metrics to the SDN controller.

The techniques of various embodiments may be implemented using software, hardware and/or a combination of software and hardware. Various embodiments are directed to apparatus, e.g., border controllers, telecommunications systems, network nodes and/or network equipment devices. Various embodiments are also directed to methods, e.g., method of controlling and/or operating border controllers, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments nodes and/or elements described herein are implemented using one or more modules to perform the steps corresponding to one or more methods, for example, message reception, signal processing, sending, comparing, determining and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, including a processor configured to implement one, multiple or all of the steps of one or more methods of the invention.

In some embodiments, the processor or processors, e.g., CPUs, of one or more devices or apparatus, e.g., real time communications devices, session border controllers, SDN controllers, etc., are configured to perform the steps of the methods described as being performed by the device or apparatus, e.g., real-time communications devices, session border controllers, SDN controllers, etc. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node such as a session border controller or SDN controller, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a session border controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a software defined networking (SDN) controller in a software defined network, said method comprising:
    receiving, at a receiver of the SDN controller via said software defined network, application level metrics corresponding to a data communications session flow;
    determining, by the SDN controller, a status of a communications path between two Internet Protocol addresses based on the received application level metrics;
    receiving, at the SDN controller from a first device via said software defined network subsequent to receiving said application level metrics, a request for a data flow communications path between said two Internet Protocol addresses, one of said two Internet Protocol addresses corresponding to said first device;
    determining said data flow communications path between said two Internet Protocol addresses based on said application level metrics;
    transmitting, from a transmitter of the SDN controller, in response to said request for a data flow communications path the determined data flow communications path between said two Internet Protocol addresses; and
    wherein said determining said data flow communications path between said two Internet Protocol addresses based on said application level metrics includes determining which links and devices in the software defined network need to be traversed for optimum network utilization or quality.

2. The method of claim 1 wherein one or more of said application level metrics is based on at least one of Quality of Service (QoS), load, or financial cost.

3. The method of claim 1 wherein said determining said data flow communications path between said two Internet Protocol addresses includes:
    determining multiple different paths through the software defined network;
    deducting from application level metrics received for different data communications flows the status of links on each of the different multiple paths determined; and
    eliminating any paths which include a link deducted as experiencing a problem.

4. The method of claim 1 wherein said determining said data flow communications path between said two Internet Protocol addresses is further based on aggregated application level metrics received pertaining to a plurality of different data session communications flows.

5. The method of claim 1 wherein said application level metrics are included in one or more messages, said one or more messages including a data communications session flow identifier, said data communications session flow identifier identifying the data communications session flow to which the application level metrics pertain.

6. The method of claim 5, wherein said one or more messages further includes a flag indicating whether the application level metrics included in the one or more messages are aggregated application level metrics.

7. A method of operating a Session Border Controller (SBC) in a software defined networking (SDN) system including:
    transmitting from a transmitter in the Session Border Controller to a SDN network controller a request for a path for a data communications session flow between a first Internet Protocol address corresponding to said SBC and a second Internet Protocol address;
    receiving at a receiver of the SBC a data communications session flow path with a data communications session flow identifier in response to said request;
    determining application level metrics at said SBC for said data communications session flow; and
    transmitting from said transmitter in the Session Border Controller the application level metrics to the SDN network controller.

8. The method of claim 7 wherein said application level metrics include the results of measurements made by the Session Border Controller.

9. The method of claim 8 wherein said application level metrics include one or more quality of session metrics based on the results of one or more of the following measurements: number of packets exchanged, packet loss, loss rate, discard rate due to late arrival of packets, burst density gap, gap durations, Mean Opinion Score (MOS) score, Rx factor, jitter, round-trip-time, and number of consecutive packet losses for packet loss periods experienced during the session.

10. The method of claim 7 wherein transmitting from said transmitter in the Session Border Controller the application level metrics to the SDN network controller includes transmitting one or more messages that include the application level metrics, said one or more messages including the data communications session flow identifier.

11. A software defined networking (SDN) controller comprising:
    a receiver for receiving via a software defined network application level metrics corresponding to a data communications session flow;
    a transmitter; and
    a processor configured to control the SDN controller to determine a status of a communications path between two Internet Protocol addresses based on the received application level metrics; and
    wherein said receiver is also for receiving a request for a data flow communications path between said two Internet Protocol addresses via said software defined network subsequent to receiving said application level metrics; and
    wherein said processor is further configured to control said SDN controller to determine said data flow communications path between said two Internet Protocol addresses based on said application level metrics and to operate said transmitter in response to said request for a data flow communications path to transmit the determined data flow communications path between said two Internet Protocol addresses;
    wherein said processor is further configured to control said SDN controller to determine which links and devices in the software defined network need to be traversed for optimum network utilization or quality as part of said operation to determine said data flow communications path between said two Internet Protocol addresses based on said application level metrics.

12. The SDN controller of claim 11 wherein said processor is further configured, as part of controlling said SDN controller to determine which links and devices in the software defined network need to be traversed for optimum network utilization or quality as part of said operation to determine said data flow communications path between said two Internet Protocol addresses based on said application level metrics, to control said SDN controller to:
   determine multiple different paths through the software defined network;
   deduct from application level metrics received for different data communications flows the status of links on each of the different multiple paths determined; and
   eliminate any paths which include a link deducted as experiencing a problem.

13. The SDN controller of claim 11 wherein said processor is further configured to control said SDN controller to determine said data flow communications path between said two Internet Protocol addresses also based on aggregated application level metrics received pertaining to a plurality of different data session communications flows.

14. A Session Border Controller (SBC) comprising:
   a transmitter for transmitting from the Session Border Controller to a software defined networking (SDN) network controller a request for a path for a data communications session flow between a first Internet Protocol address corresponding to said SBC and a second Internet Protocol address;
   a receiver for receiving a data communications session flow path with a data communications session flow identifier in response to said request;
   a processor configured to control said SBC to determine application level metrics at said SBC for said data communications session flow; and
   said transmitter configured to transmit said application level metrics to the SDN network controller.

15. The Session Border Controller of claim 14 wherein said application level metrics include the results of measurements made by the Session Border Controller.

16. The Session Border Controller of claim 15 wherein at least some of said measurements cannot be made by said SDN network controller.

17. The Session Border Controller of claim 16 wherein said transmitter is configured to transmit at least some of said application level metrics in raw form.

18. The Session Border Controller of claim 14 wherein said transmitter is further configured to transmit said application level metrics to the SDN network controller using one or more messages that include the application level metrics, said one or more messages including the data communications session flow identifier.

19. The Session Border Controller of claim 18 further comprising:
   a software application;
   wherein said Session Border Controller is located on the edge of the software defined network; and
   and wherein said application level metrics include information indicating the results of a measurement made at the Session Border Controller by the software application.

20. The Session Border Controller of claim 19 wherein said data communications session flow is a Voice Over Internet Protocol communications session flow and said application level metrics include information on a denial of service attack detected by said software application.

* * * * *